(12) United States Patent
Morris et al.

(10) Patent No.: US 11,522,925 B2
(45) Date of Patent: Dec. 6, 2022

(54) SYSTEMS AND METHODS FOR TELECONFERENCING VIRTUAL ENVIRONMENTS

(71) Applicant: NWR Corporation, Brooklyn, NY (US)

(72) Inventors: Jonathan Leonard Morris, Brooklyn, NY (US); Maxwell Jared Berkowitz, Brooklyn, NY (US); Ana Luiza De Araujo Lima Constantino, Brooklyn, NY (US); Evan Frohlich, Queens, NY (US); Dacre Denny, Pokuru (NZ); Gregory Liburd, Brooklyn, NY (US)

(73) Assignee: NWR CORPORATION, Brooklyn, NY (US)

( * ) Notice: Subject to any disclaimer, the term of this patent is extended or adjusted under 35 U.S.C. 154(b) by 0 days.

(21) Appl. No.: 17/475,260

(22) Filed: Sep. 14, 2021

(65) Prior Publication Data

US 2022/0086203 A1 Mar. 17, 2022

Related U.S. Application Data

(60) Provisional application No. 63/078,201, filed on Sep. 14, 2020.

(51) Int. Cl.
*G06F 17/00* (2019.01)
*H04L 65/403* (2022.01)
(Continued)

(52) U.S. Cl.
CPC ............ *H04L 65/403* (2013.01); *G06F 3/165* (2013.01); *H04N 7/157* (2013.01); *H04S 7/302* (2013.01)

(58) Field of Classification Search
CPC ....... H04L 65/403; G06F 3/165; H04N 7/157; H04S 7/302
(Continued)

(56) References Cited

U.S. PATENT DOCUMENTS 11,082,467 B1 * 8/2021 Hartnett ............. H04L 65/1069
2007/0279484 A1 * 12/2007 Derocher ................. H04N 7/15
348/14.09

(Continued)

FOREIGN PATENT DOCUMENTS

| EP | 3702008 A1 | 9/2020 |
| WO | 2008125593 A2 | 10/2008 |

OTHER PUBLICATIONS

International Search Report and Written Opinion issued in International Patent Application No. PCT/US2021/050333, dated Mar. 7, 2022.

(Continued)

*Primary Examiner* — Paul C McCord
(74) *Attorney, Agent, or Firm* — Volpe Koenig; Daniel E. Rose

(57) ABSTRACT

In some aspects, the disclosure is directed to methods and systems for providing a three-dimensional virtual environment with teleconferencing audio and video feeds placed within the environment via three-dimensional virtual avatars, including indications of directional orientation or facing, and with mixing of spatial audio providing directionality and distance cues. By utilizing a three dimensional environment for display of video streams, video streams corresponding to or displayed on avatars that are farther from the viewer appear smaller within the three dimensional view, and thus can be easily downscaled or reduced in resolution or bit rate without adversely affecting the user experience.

18 Claims, 21 Drawing Sheets

(51) Int. Cl.
*G06F 3/16* (2006.01)
*H04N 7/15* (2006.01)
*H04S 7/00* (2006.01)

(58) Field of Classification Search
USPC .......................................... 709/204; 700/94
See application file for complete search history.

(56) References Cited

U.S. PATENT DOCUMENTS

| | | | |
|---|---|---|---|
| 2008/0068446 A1* | 3/2008 | Barkley | H04N 7/14 348/14.07 |
| 2011/0271192 A1* | 11/2011 | Jones | H04N 7/15 715/727 |
| 2013/0227437 A1 | 8/2013 | Brody et al. | |
| 2016/0227172 A1 | 8/2016 | Safaei et al. | |
| 2017/0364752 A1* | 12/2017 | Zhou | H04R 1/326 |
| 2018/0352193 A1* | 12/2018 | Sakai | H04M 11/00 |
| 2020/0099891 A1 | 3/2020 | Valli et al. | |
| 2020/0322395 A1* | 10/2020 | Copley | H04L 65/605 |

OTHER PUBLICATIONS

Hideyuki Nakanishi et al.; "Freewalk: A Meeting Environment for Casual Communication in a Net-Worked Community" IEEE Multimedia, vol. 6, No. 2; Apr. 1, 1999 [Abstract].

* cited by examiner

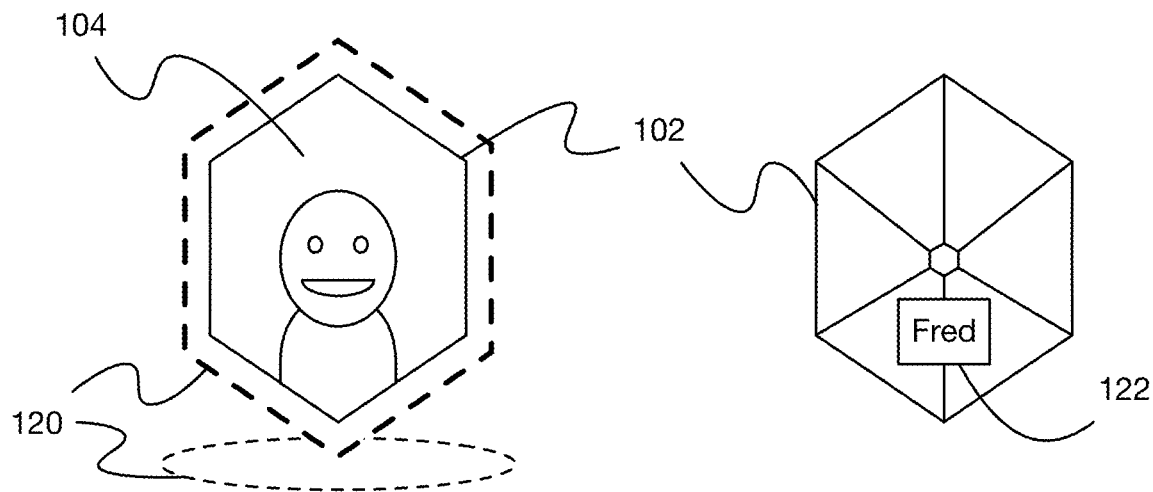
FIG. 1E  FIG. 1F
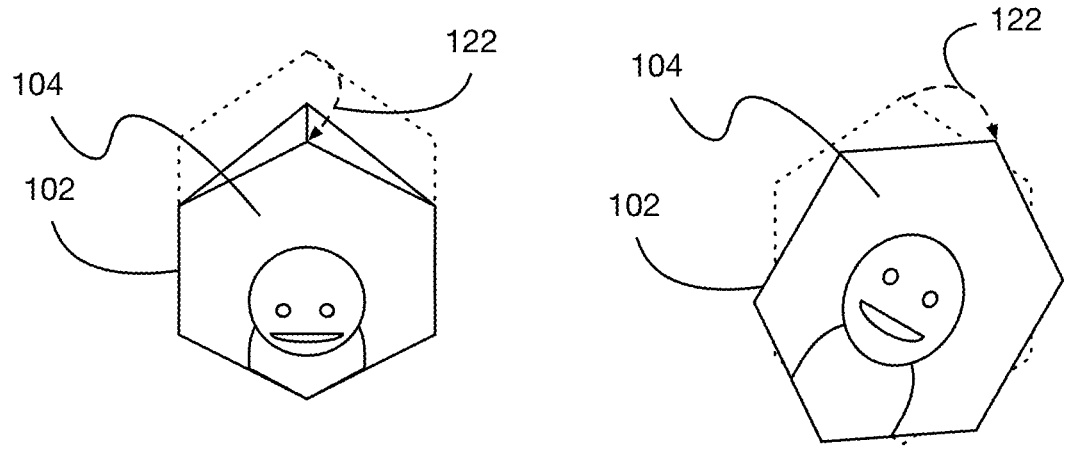
FIG. 1G  FIG. 1H

SYSTEMS AND METHODS FOR TELECONFERENCING VIRTUAL ENVIRONMENTS

RELATED APPLICATIONS

This application claims the benefit of and priority to U.S. Provisional Patent Application No. 63/078,201, entitled "Systems and Methods for Teleconferencing Virtual Environments," filed Sep. 14, 2020, the entirety of which is incorporated herein by reference.

FIELD OF THE DISCLOSURE

This disclosure generally relates to systems and methods for audio and video teleconferencing within virtual environments.

BACKGROUND OF THE DISCLOSURE

Telecommunications and video conferencing applications allow users at remote locations to communicate in real time, with audio and video provided by microphones and cameras of each user's computing device. However, presentation of these telecommunications, particularly with more than two participants, is frequently unintuitive and destroys any sense of immersion. For example, many video conferencing applications present views of each participant in a grid format. Because each view is typically captured by a camera in front of the corresponding participant, the result is a grid of faces all staring out at the user, even when two remote participants are talking to each other with the user as a passive listener. The lack of contextual queues, such as remote participants looking at each other while talking, may render group teleconferencing difficult to use. Similarly, because audio from each participant is typically mixed to a single mono feed (or stereo, but with identical left and right channels), it can be difficult to understand when multiple participants are speaking simultaneously. As a result of these technical limitations, conversation flow is frequently stilted, with more of a "presentation to an audience" feel rather than a casual dialogue or party.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 1E is an illustration of an avatar for a teleconferencing virtual environment incorporating visual speaking cues, according to some implementations;

FIG. 1F is an illustration of a rear view of an avatar for a teleconferencing virtual environment incorporating visual identity cues, according to some implementations;

FIGS. 1G and 1H are illustrations of an avatar for a teleconferencing virtual environment with pitch and roll applied, respectively, accordingly to some implementations;

Figure 1A:
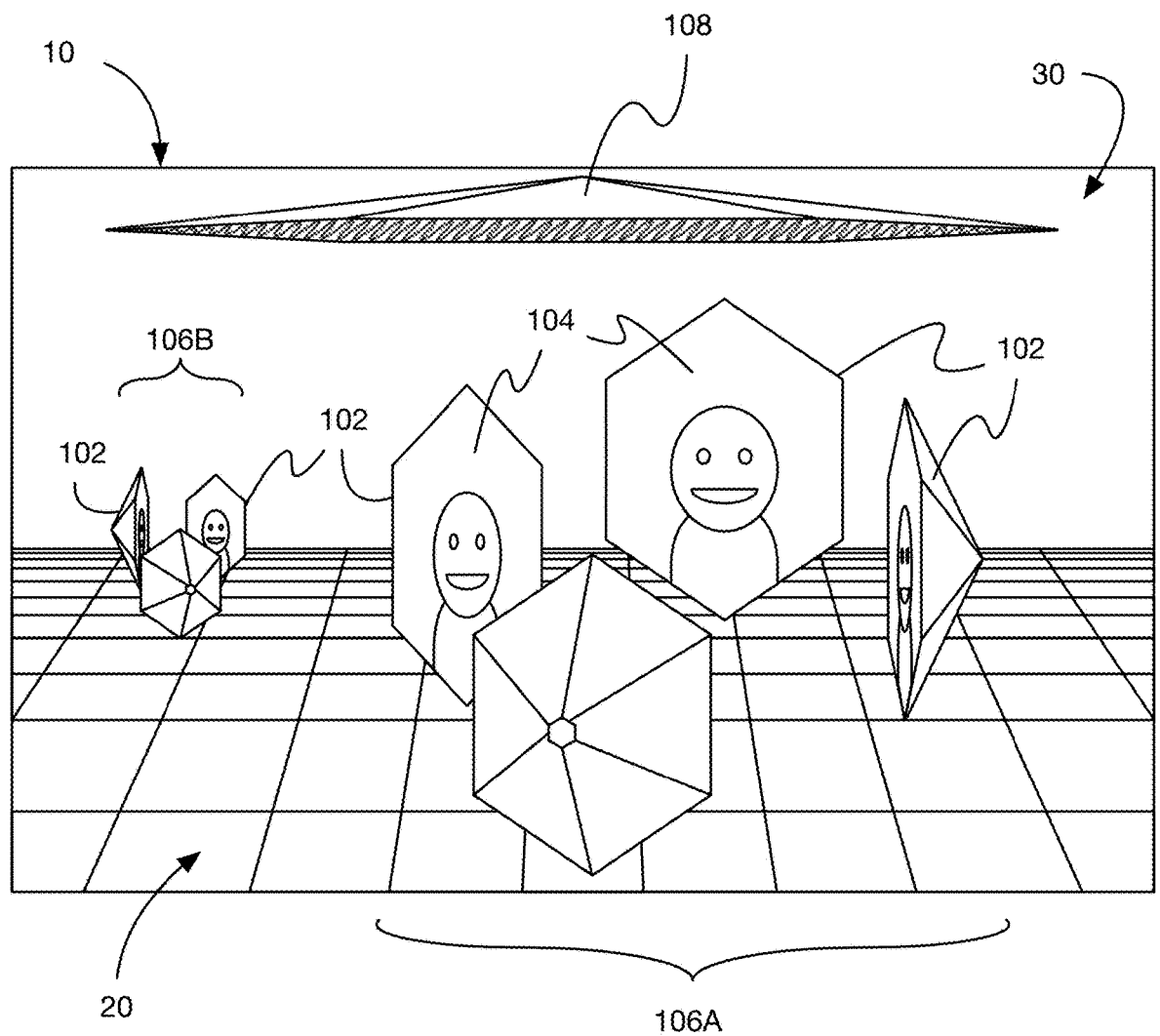
FIG. 1A is an illustration of an example of a teleconferencing virtual environment, according to some implementations.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

Section A describes embodiments of systems and methods for teleconferencing virtual environments; and Section B describes a computing environment which may be useful for practicing embodiments described herein.

A. Systems and Methods for Teleconferencing Virtual Environments

Telecommunications and video conferencing applications allow users at remote locations to communicate in real time, with audio and video provided by microphones and cameras of each user's computing device. Such computing devices can include mobile device such as smartphones, tablet devices, laptop computers, desktop computers, embedded devices or appliances (including Internet-of-Things or IoT devices), or any other type and form of computing device. Each camera typically captures a head or upper body picture of the corresponding user, and a microphone (either internal to the computing device, or frequently an external microphone such as a headset microphone or microphone on a stand) records the user's voice. The computing device may encode corresponding video and audio streams and provide the streams either directly to other computing devices via peer-to-peer communications, via a central server (as a spoke-and-hub configuration), or as a hybrid of these architectures.

In many instances, received video streams from remote computing devices may be displayed in a grid or other predetermined configuration, with each video stream corresponding to a remote user's camera. Because each view is typically captured by a camera in front of the corresponding participant, the result is a grid of faces all staring out at the user, even when two remote participants are talking to each other with the user as a passive listener. While this may be unintuitive and frustrating to use, in many implementations such as those in which video streams are mixed by a central server or hub into a single video stream to reduce bandwidth or processing requirements at the individual users' devices, technical limitations prevent the inclusion of additional contextual queues, such as having remote participants looking at each other while talking. Similarly, because audio from each participant is typically mixed to a single mono feed (or stereo, but with identical left and right channels), it can be difficult to understand when multiple participants are speaking simultaneously. In some implementations in order to indicate which user is talking, a speaking participant's video stream may be highlighted or made more prominent within the grid (e.g. moving the video stream to a primary position or larger grid square). However, moving video streams around the user's screen dynamically as people speak and fall silent can be highly confusing. With a few participants, it's relatively easy to scan across the grid to find a new position of each video feed, but these implementations suffer from a lack of scalability. In remote learning environments with dozens or even hundreds of participants, it may become near impossible to follow one user's video feed as the grid is reshuffled each time a new participant speaks. As a result of all of these technical limitations, conversation flow is frequently stilted, with more of a "presentation to an audience" feel rather than a casual dialogue or party.

To address these and other technical limitations, implementations of the systems and methods discussed herein provide a three-dimensional virtual environment with teleconferencing audio and video feeds placed within the environment via three-dimensional virtual avatars, including indications of directional orientation or facing, and with mixing of spatial audio providing directionality and distance cues. Advantageously, by utilizing a three dimensional environment for display of video streams, video streams corresponding to or displayed on avatars that are farther from the viewer appear smaller within the three dimensional view, and thus can be easily downscaled or reduced in resolution or bit rate without adversely affecting the user experience.

FIG. 1A is an illustration of an example of a teleconferencing virtual environment 10 corresponding to a viewport of a virtual camera or view of a display rendered for a user (e.g. on a display of a computing device of the user), according to some implementations. The virtual environment may, in some implementations, comprise a ground plane 20 and skybox 30, and may include additional environmental objects not illustrated, including walls, buildings, stairs, ramps, platforms, mountains, water features, clouds, or any other such objects. For example, in some implementations, the virtual environment may be configured as a club or bar with corresponding features (e.g. walls, tables and chairs, a stage or dance floor, or other such features). Although shown as a single two dimensional image of a three dimensional environment, in some implementations, stereoscopic views may be provided (e.g. for virtual reality headsets or similar devices). In some implementations, multiple separate virtual environments may be provided, and users may be allowed to transfer between virtual environments (e.g. connecting to a different server instance or environment, sometimes referred to as "teleporting", which may be enabled via interactive controls in the environments in some implementations such as buttons, "portals", elevators, trains, taxies, or other such skeuomorphic elements that indicate a passage to a different location).

Avatars 102 corresponding to other users may be displayed within the virtual environment at specified positions. In some implementations, avatars 102 may comprise full body avatars (e.g. with arms, legs, torsos, and heads), while in other implementations as illustrated, avatars 102 may comprise geometric shapes (which may be regular or irregular shapes) or other objects. Avatars 102 may include a portion displaying a video stream 104 of the corresponding user (e.g. from the corresponding user's computing device's camera), such as on a flat surface of a geometric shape as illustrated. Avatars 102 may be moved within the three dimensional environment by the corresponding user with up to six degrees of freedom (e.g. three translational and three rotational degrees of freedom) in some implementations. For example, in some implementations, a user may use a mouse to freely "look around" with mouse movements corresponding to rotational degrees of freedom (e.g. an x direction corresponding to yaw and a y direction corresponding to pitch), and may use arrow keys or other inputs (e.g. a joystick, letter keys, etc.) to provide translational degrees of freedom (e.g. forward, backwards, left, right, and in some implementations, up or down), that may be applied to the avatar 102 to move and reorient it within the environment 10. The same rotations and/or translations may be applied to the virtual camera of the user within the three dimensional environment, such that the user's viewpoint corresponds to the orientation and position of the avatar 102 and/or video stream 104 position or facing. In other implementations, rotations and translations may be determined via other means, such as via body tracking or head tracking (e.g. via stereoscopic cameras, depth cameras, beacon or controller tracking of handheld or head mounted controllers, etc.). For example, if a user leans to one side, their computing device may use head tracking to detect the lean and measure the angle and provide a corresponding rotation to the user's avatar. In some implementations, full body or head gestures may be enabled in a similar matter, such as animating the avatar with a dancing motion in response to detection of a user bouncing or dancing in the camera view. Accordingly, face or body movements may be mapped to the avatar's movements in some such implementations.

Accordingly, a first user may turn their virtual camera to look at an avatar of another user (e.g. in response to them speaking), and the first user's avatar 102 may turn correspondingly. The other user (and any additional users) may see the first user's avatar's rotation, and may intuitively interpret this as a signal that the first user is paying attention to the other user. As shown, this correspondence of avatar and video stream may allow users to face each other to have a conversation in a group, e.g. groups 106A and 106B, which may be distributed throughout the space.

Figure 1B:
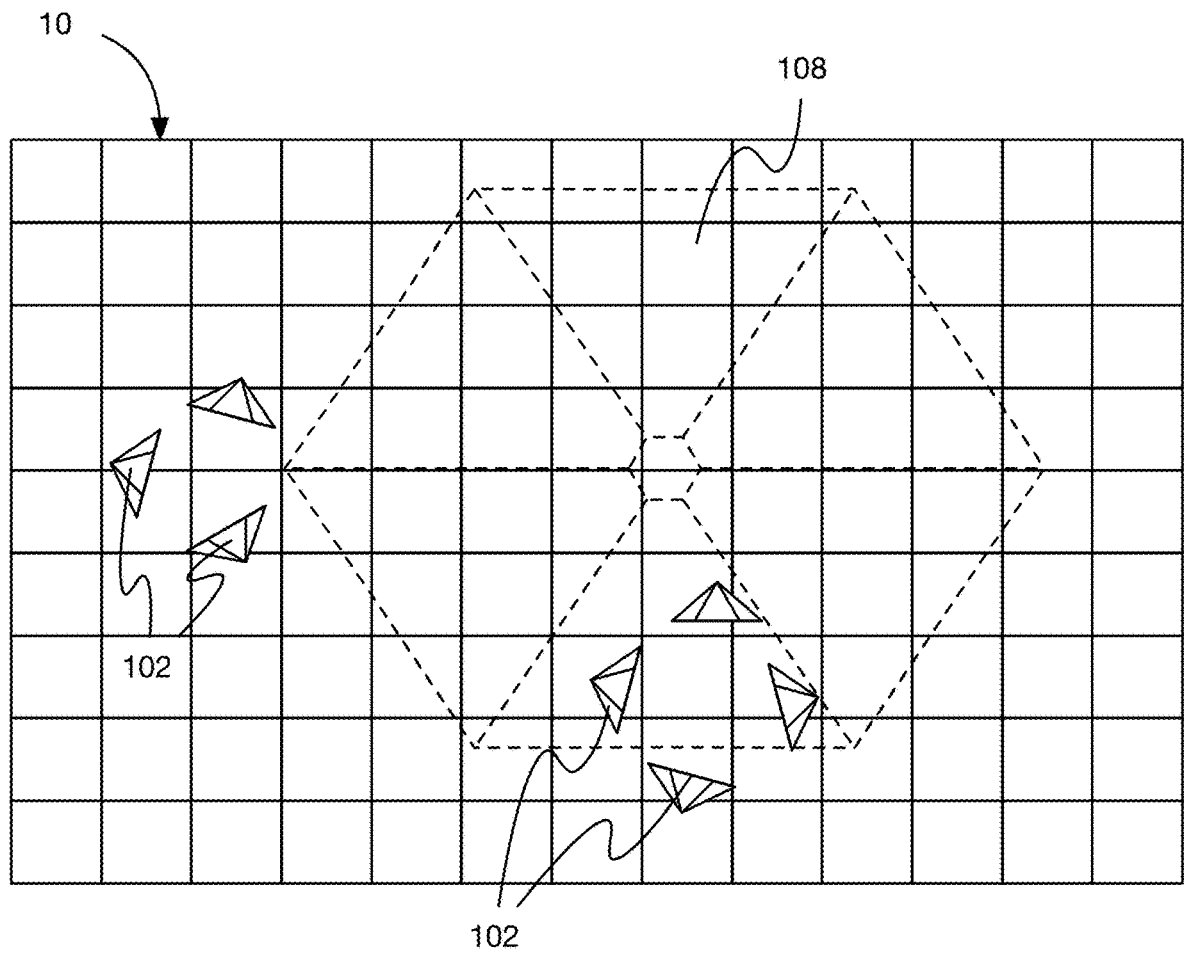
FIG. 1B is an illustration of a top view of the example of a teleconferencing virtual environment of FIG. 1A, according to some implementations.

Referring briefly to FIG. 1B, illustrated is a top view of the virtual environment 10 of FIG. 1A, according to some implementations. As shown, avatars 102 may be placed in various positions and orientations by their corresponding users, allowing for distinct conversational groupings.

Returning to FIG. 1A, As discussed above, video streams of avatars that are farther from the viewer, such as the avatars of group 106B in FIG. 1A, may be shown at lower resolutions and/or bit rate. This may allow for significant reductions in bandwidth relative to grid-based video conferencing applications as only a few avatars are likely to be at "close" range and displayed at a high resolution or bit rate. For example, given a dozen users with only four users in close proximity, video streams of the remaining users may be displayed at lower bitrates selected based on distance between the corresponding avatars and the viewpoint, potentially reducing bandwidth relative to rendering full bandwidth streams by up to 50% or more.

Audio corresponding to each avatar (e.g. recorded by microphones at each user's computing device and provided as a media stream) may be spatially mixed based on the relative positions and orientations of the corresponding avatars and the user's avatar. For example, audio from a first remote user corresponding to an avatar 102 to the user's "left" in the virtual environment may be panned to the left of a stereo field, while audio from a second remote user corresponding to an avatar 102 to the user's "right" in the virtual environment may be panned to the right in the stereo field. Accordingly, the stereo audio image of each audio stream may be placed in a position within the stereo field corresponding to the relative position of the avatar to the user's virtual camera and avatar, allowing easy localization of speakers and separation of simultaneous speakers at distinct positions. Furthermore, in many implementations, audio streams may be attenuated according to the relative distance between the user and the corresponding avatar. For example, in the illustration of FIG. 1A, audio streams corresponding to users in conversation group 106B may be more attenuated than audio streams corresponding to users in conversation group 106A, which is closer to the viewer in the three dimensional environment. Such attenuation may be applied as a factor of the relative distance between the viewer and the other avatar, and may be directly proportional to the distance, exponentially proportional to the distance, or otherwise a function of the distance, depending on implementation.

In a further implementations, audio may be additionally attenuated according to a relative orientation of the avatars. For example, an audio stream corresponding to an avatar facing away from the viewer or user may be attenuated to a greater degree than an audio stream of a second avatar at the same distance facing the viewer or user. This may be particularly helpful in separating out distinct dialog, particularly for large pluralities of users.

In some implementations, additional media streams not corresponding to users may be placed within the three dimensional environment 10. For example, a "virtual avatar" 108 that does not correspond to a user may be placed within the virtual environment and correspond to a video stream and/or audio stream from a source other than a user, such as a media server. Images, slides, animations, music videos, television programs, movies, or other content may be displayed in the same manner as a user's avatar, with a video stream rendered on a surface of the virtual avatar 108 and/or an audio stream spatially placed in the environment (e.g. with attenuation and/or panning as discussed above) at a position corresponding to the virtual avatar. As shown in FIG. 1A and displayed in dashed line in FIG. 1B, the virtual avatar 108 may be of a distinct size from other avatars 102 (e.g. larger in many implementations). This may be utilized for background music during a conversation, for example, or for group viewing of a video or presentation. For example, spatial audio from a virtual avatar 108 may be provided to users with avatars 102 in a region "beneath" the virtual avatar or in a direction of its facing, using the same techniques discussed above with regards to other avatars and audio streams. By covering a larger area, in some implementations, the audio stream corresponding to the virtual avatar may be provided to a similarly large area of the environment, providing for broadcasting the audio (e.g. background music) to a large number of users, without requiring a separate system or technique (such as a separate "broadcast" stream that is handled differently than media streams corresponding to other avatars). This may also allow for the creation of multiple "zones" beneath a plurality of virtual avatars, for example, with different background music in different areas of the virtual environment. In some implementations, the virtual avatar's position and orientation may be manually controlled by a user or administrator, or may automatically follow a predetermined path through the environment (e.g. with a specified speed or timing).

Although shown as geometric shapes, as discussed above, in some implementations, avatars 102 may comprise full or partial body avatars (e.g. including limbs and/or torsos). In some implementations, such full body avatars may include a flat face on which a video stream corresponding to a user's camera may be displayed (e.g. mapping the user's video to a flat "screen" on a head of the full body avatar). In other implementations, a three dimensional face corresponding to the user may be rendered on the full body avatar. In one implementation, the face may be animated to match movements of the user's face captured by the camera of the user's computing device (e.g. with animated lips or eyes following the user's lips or eyes, via facial recognition technology).

Figure 1C:
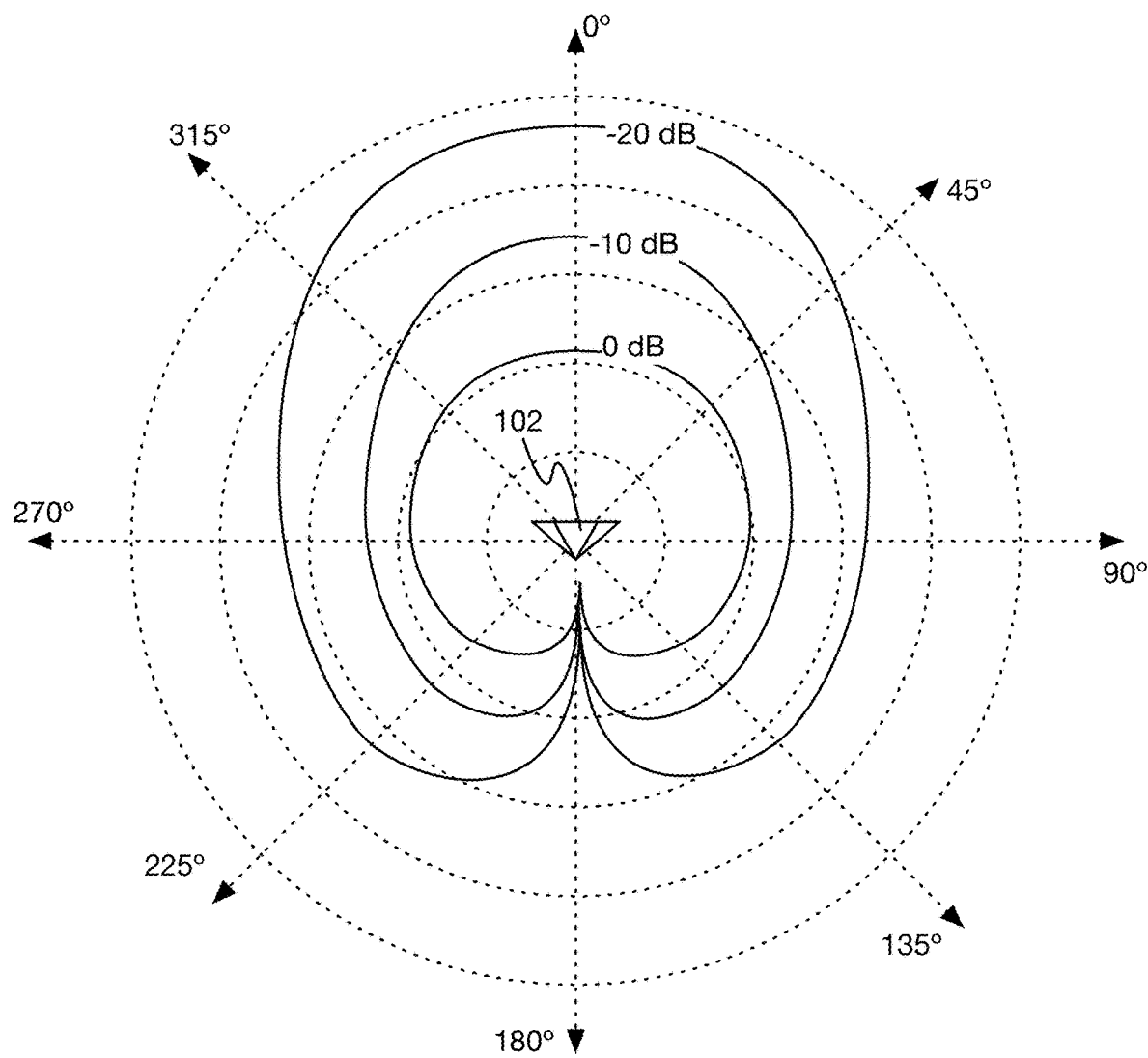
FIG. 1C is a polar plot of audio attenuation patterns by direction and distance, according to some implementations.

As discussed above, spatial audio may be used to place an audio stream corresponding to an avatar in an appropriate position (e.g. panning within a stereo field or stereo attenuation, dynamically adjusting the level of an audio signal within stereo channels to control its apparent direction and/or distance) corresponding to the relative positions or orientations of the avatar and the viewer. Attenuation may also be used to reduce audio corresponding to avatars that are further away. For example, FIG. 1C is a polar plot of audio attenuation patterns for an audio stream corresponding to an avatar 102 by direction and distance, according to some implementations. As shown, depending on relative direction and distance from the avatar 102, a viewer's computing device may attenuate the audio stream (e.g. 0 dB at a first "conversational" distance, −10 dB at a middle distance, −20 dB at a further distance, etc.). In some implementations, such attenuation may also be dependent on a facing of the avatar, as in the cardioid pattern illustrated in FIG. 1C in which the audio is more attenuated to the sides and rear of the avatar than to the front. This may allow users to "direct" their conversation to another user by turning their avatar, and also allow for users to have clearer conversations with others by reducing distractions of other nearby conversations. This provides a distinct advantage over grid-based teleconferencing systems in which all users are at the same audio volume, preventing simultaneous conversations between separate sub-groups of users that are participating in the teleconference. Although the pattern shown in FIG. 1C is a cardioid pattern, other attenuation patterns may be utilized, including omnidirectional, figure-8 (e.g. with greater attenuation at 90° and 270°), or hyper-cardioid (e.g. with greater attenuation at 135° and 225°) patterns may be utilized. This may be particularly useful for virtual avatars. Furthermore, although the pattern shown in FIG. 1C has distinct levels for clarity (e.g. −10 dB, −20 dB), in many implementations, the attenuation may be calculated as a continuous function of distance and direction from the viewer avatar (e.g. increasing attenuation by 6 dB for every doubling of the distance to the viewer avatar for an omnidirectional source, or any other such function including functions that increase attenuation to a greater or lesser degree by distance).

Figure 1D:
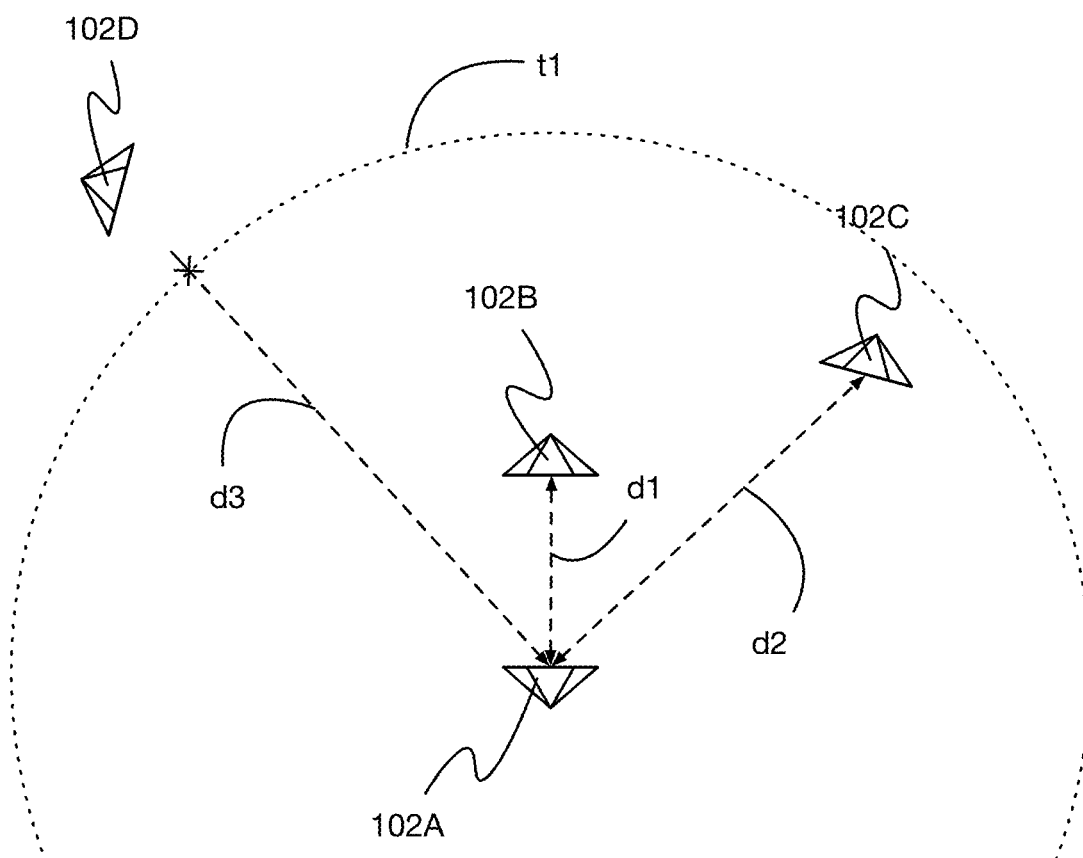
FIG. 1D is another illustration of a top view of a teleconferencing virtual environment, according to some implementations.

Additionally, by attenuating the audio based on distance from the viewer, audio streams corresponding to avatars that are very far away may be completely attenuated or eliminated altogether; accordingly, such streams need not be provided to the viewer's computing device, reducing bandwidth and processing requirements and drastically increasing scalability. FIG. 1D is a top view of a virtual environment with a plurality of avatars 102B-102C at different directions and distances relative to a viewer or first avatar 102A, according to some implementations. A media stream corresponding to avatar 102B at a distance d1 may be attenuated by a first amount (or not at all), and a media stream corresponding to avatar 102C at distance d2 may be attenuated by a second, greater amount, while a media stream corresponding to avatar 102D at a distance d3 that is greater than a threshold t1 may be completely attenuated or eliminated. This provides a distinct advantage over implementations of a grid-based teleconferencing system, both by reducing background noise and increasing intelligibility of nearby conversations, and increasing scalability: for such grid-based teleconferencing systems not utilizing the systems and methods discussed herein, it would be near impossible to allow simultaneous connections to a thousand users in any manner other than a one-to-many configuration, eliminating the possibility of multiple simultaneous conversations amongst the users. By contrast, the systems and methods discussed herein allow for such users to control their avatars within the environment to move into separate conversational groupings of a more reasonable size (e.g. 5 users) and have a separate, non-interfering conversations simultaneously. In implementations in which audio streams from the majority of other users are attenuated to the point of elimination, only the few "nearby" audio streams (plus maybe a few additional streams at a middle distance) need be received and processed, with the vast majority of the thousand audio streams not transmitted to the viewer's computing device. While grid-based teleconferencing systems may approximate this by having users disconnect and join into separate smaller teleconferences, this requires additional management overhead (e.g. handshaking, terminating and setting up connections, etc.), cannot be dynamically reorganized in real time (e.g. as a viewer wanders freely from one conversational group to another), and also prevents simultaneous broadcasts to all of the users (e.g. as in background music, or if a host wishes to make an announcement to all of the conversational groups together).

FIG. 1E is an illustration of an avatar 102 for a teleconferencing virtual environment incorporating visual speaking cues, according to some implementations. In some implementations, to provide visual indicators of a user speaking (both to help debug audio issues and to help other users focus visual attention on the person talking), an indicator 120 such as a ring, glow, shadow, particle effects, or other such visual indicators may be displayed around, under, or on top of a user's avatar in response to detecting the user's speech (e.g. by detecting input audio at a microphone of the user's computing device exceeding a threshold). In a similar implementation, a color of the ring, glow, shadow or other visual indicator 120 may be used to indicate a user's status (e.g. a player level within a game or team membership, whether a user has been idle for a given period of time, whether a user has set a "do not disturb" function, etc.).

FIG. 1F is an illustration of a rear view of an avatar 102 for a teleconferencing virtual environment incorporating visual identity cues, according to some implementations. In some implementations, avatars may be customized with identity tags 122 or other visual entities (e.g. patterns, labels, icons, virtual clothing, or other such entities) to aid in identifying geometric or non-distinct avatars from angles where a video stream is not displayed.

As discussed above, in some implementations, avatars 102 may have three rotational degrees of freedom, including pitch and roll (tilting forwards and backwards, and from side to side) in addition to yaw (turning left or right). FIGS. 1G and 1H are illustrations of an avatar for a teleconferencing virtual environment with pitch and roll applied, respectively, according to some implementations. As discussed above, in various implementations, such rotations may be controlled via an input device such as a mouse, keyboard, or joystick, or by performing head or body tracking via a camera of the user's computing device, with the avatar controlled to rotate in a direction and amount based on the tracked and detected user movements.

Figure 1I:
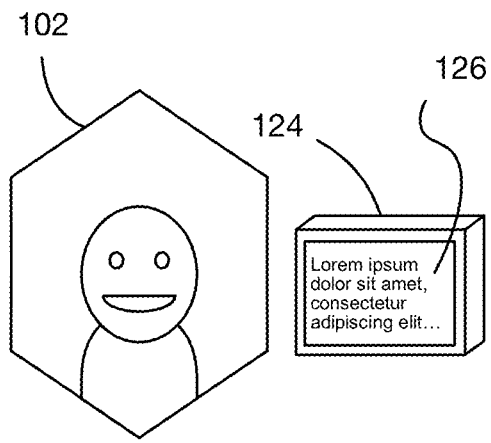
FIG. 1I is an illustration of a display of an avatar and virtual avatar for a teleconferencing virtual environment, according to some implementations.

As discussed above, in some implementations, virtual avatars may be utilized to provide additional video and/or audio streams. FIG. 1I is an illustration of a display of an avatar and virtual avatar for a teleconferencing virtual environment, according to some implementations. In some such implementations, a user may generate a virtual avatar 124 in order to provide additional video or image content 126 to other users. Such additional video or image content may comprise screensharing of a window, desktop, or display; file content such as an image or video file; interactive content such as a game or virtual whiteboard; or any other such content. In a further implementation, the virtual avatar 124 may be shown at a fixed position relative to the user's avatar 102, and may "follow" the user's avatar 102 within the virtual environment as they move around, effectively allowing the user to control both avatars' positions and orientations. For example, in one implementation, a user may drag and drop, paste, share from another application, or otherwise load an image or video into the virtual environment application to display the image or video within the environment on a virtual avatar or other object. In some such implementations, only one image or video may be loaded at one time, and the user may drag and drop, paste, share, or otherwise load a new image or video to replace the display of the previous image or video. In other implementations, multiple images or video may be loaded, and the user may select which to display (e.g. via an interactive menu, selection wheel, carousel, or other such interface element). The user may, in some implementations, hide or show the image or video via a key combination, menu selection, or other interaction. Similarly, in some implementations, users may be able to replace their video feed or the video stream rendered on their avatar with other media, such as animations (e.g. GIFs or animated PNG graphics) or other videos, which may be rendered and displayed for other users without utilizing a separate virtual avatar. Other visual effects may be utilized, including displaying chat bubbles (e.g. speech or thought bubbles) above an avatar for a limited time (e.g. fading out after being displayed for a predetermined time period).

In some implementations, users viewing a virtual object 124 may select the object within the virtual environment to enter a "focus" mode, in which the view of the object is enlarged (or the user's virtual camera is moved closer to the virtual object), or the video or image content 126 is displayed in a pop-up window or other view. For example, this may allow users to closely examine presentation slides, documents, or other content. In some such implementations, the virtual camera may still display the virtual environment around the pop-up window, and in a further implementation, the view of the camera may be filtered to reduce distractions (e.g. reducing saturation or brightness, blurring the background, etc.). In some implementations, the spatial audio processing may be unaffected, allowing users to continue to hear and discuss documents or content they are viewing, to aid collaboration. In a similar implementation, pop-up windows may be used to display views through virtual cameras within the environment separate from the avatar of the user, for example, as a picture-in-picture view or telescopic view. In one such implementation, a user may select a distant object within the virtual environment, and a view through a virtual camera close to the object may be displayed in a pop-up or picture-in-picture window. In some implementations, in addition to virtual objects or virtual cameras, other avatars and/or video feeds may be used for a focus mode. For example, a user may select a presenter or speaker to view that speaker's video stream in a pop-up window or picture-in-picture view.

Figure 1J:
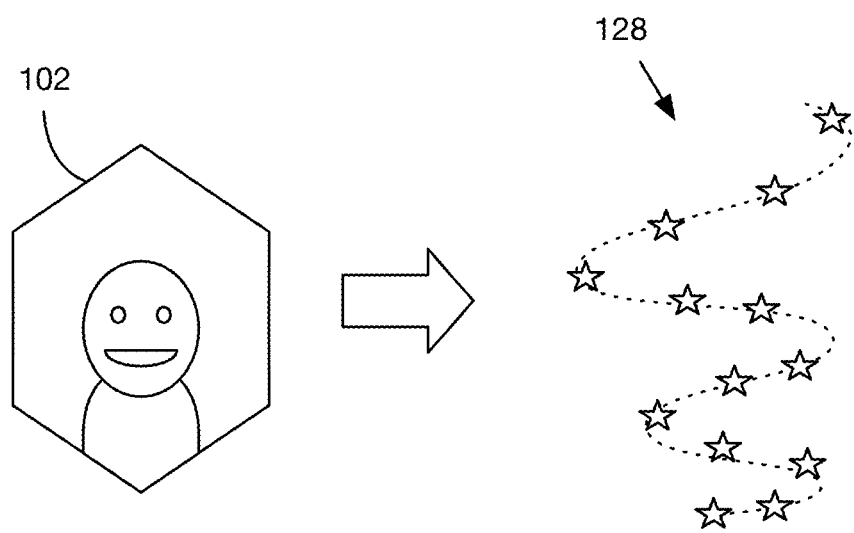
FIG. 1J is an illustration of a transformation of an avatar into a visual effect, according to some implementations.

As discussed above, in some implementations, a user's head or body movements may be tracked and used as gestures to control display of the avatar or trigger effects (or such effects may be triggered by a user interface button or other input). FIG. 1J is an illustration of a transformation of an avatar 102 into a visual effect 128, such as a particle swirl, according to some implementations. In some implementations, an avatar 102 may be transformed into such visual effects to indicate motions or actions, such as dancing or twirling. In a similar implementation, an avatar 102 may be transformed into a visual effect 128 or animated to indicate that a user has stepped away or paused their video feed, such as an animation of a ticking clock or stopwatch, an hourglass, a sleeping cat, or other such animations or videos, or the avatar itself may be moved automatically in a "holding pattern" (e.g. rotating in place, or walking in a small circle) in some such implementations. This behavior may be triggered manually by the user, or automatically, such as in response to failure to detect a human face in a user's camera feed for a period of time, lack of detection of audio from a user's microphone for a period of time, and/or lack of interaction with an input device such as a keyboard or mouse for a period of time, or other such indicators that the user may be absent.

Figure 1K:
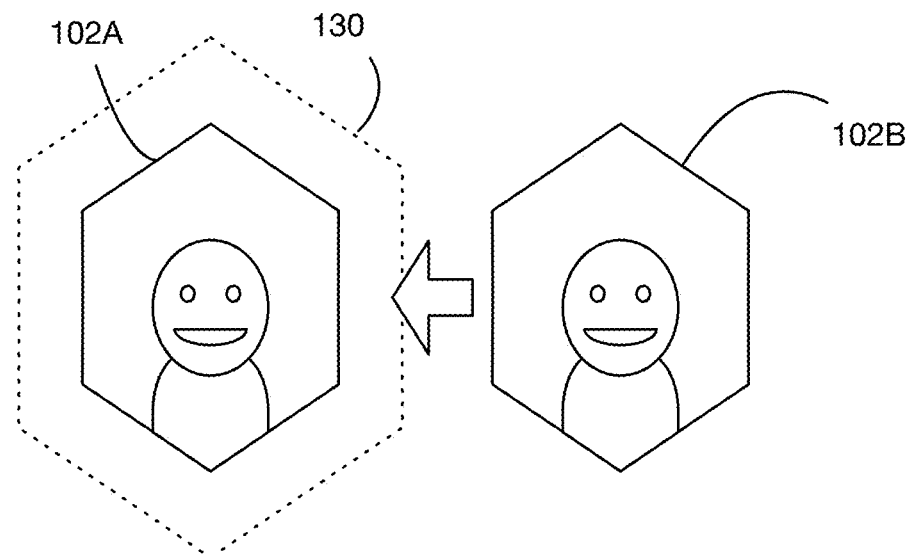
FIGS. 1K and 1L are illustrations of a front view and a virtual camera view, respectively, of an avatar being approached by another avatar in a teleconferencing virtual environment, according to some implementations.
Figure 1L:
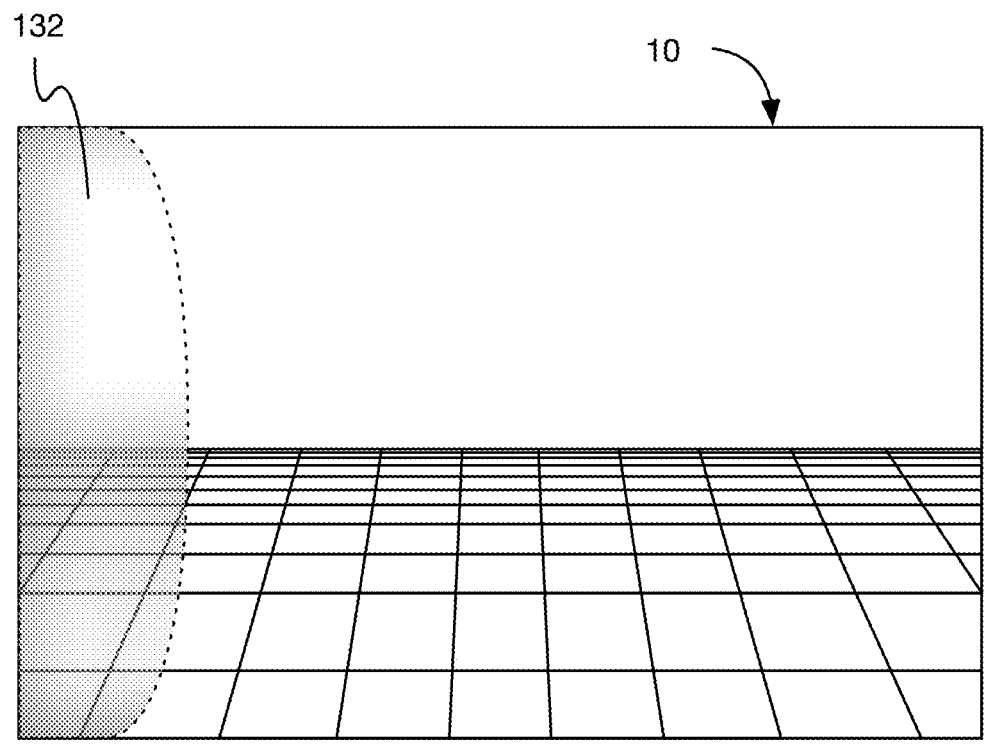

In many implementations, users may use a two dimensional display or headset display that provides no or limited peripheral vision. In some implementations, visual effects may be used to provide visual cues of physical space boundaries. For example, FIGS. 1K and 1L are illustrations of a front view and a virtual camera view, respectively, of an avatar being approached by another avatar in a teleconferencing virtual environment, according to some implementations. As shown in FIG. 1K, a first avatar 102A may be approached from the avatar's left (right in the illustration) by a second avatar 102B. With a display or headset lacking sufficient peripheral vision, the user corresponding to the first avatar 102A may not realize that the other user is approaching. Accordingly, in some implementations, responsive to the second avatar 102B crossing a distance threshold 130 (or responsive to detection of a collision between avatar entities within the three dimensional environment), a visual effect 132 such as a glow may be rendered within the display of the user of the first avatar 102A, as shown in FIG. 1L (a similar glow may be rendered within the display of the user of the second avatar 102B, on the right side of the display for the example illustrated). In some implementations, instead of or in addition to a visual effect 132, an audio effect or sound may be utilized to notify the user of the approach to or by other users, such as a bell, footsteps, a sound of a polite cough, a low hum or buzz or other noise, a car engine sound, a fan noise, or any other such audio cue. Such audio may be faded in or out proportional to the distance between avatars 102, and may be directional (e.g. panned to the direction of the approaching avatar). In many implementations, such sound may be provided only to the avatars (or corresponding devices or users) approaching each other, to prevent distraction or disturbance of other nearby avatars that are not approaching (e.g. a stationary avatar in front of the user).

Figure 1M:
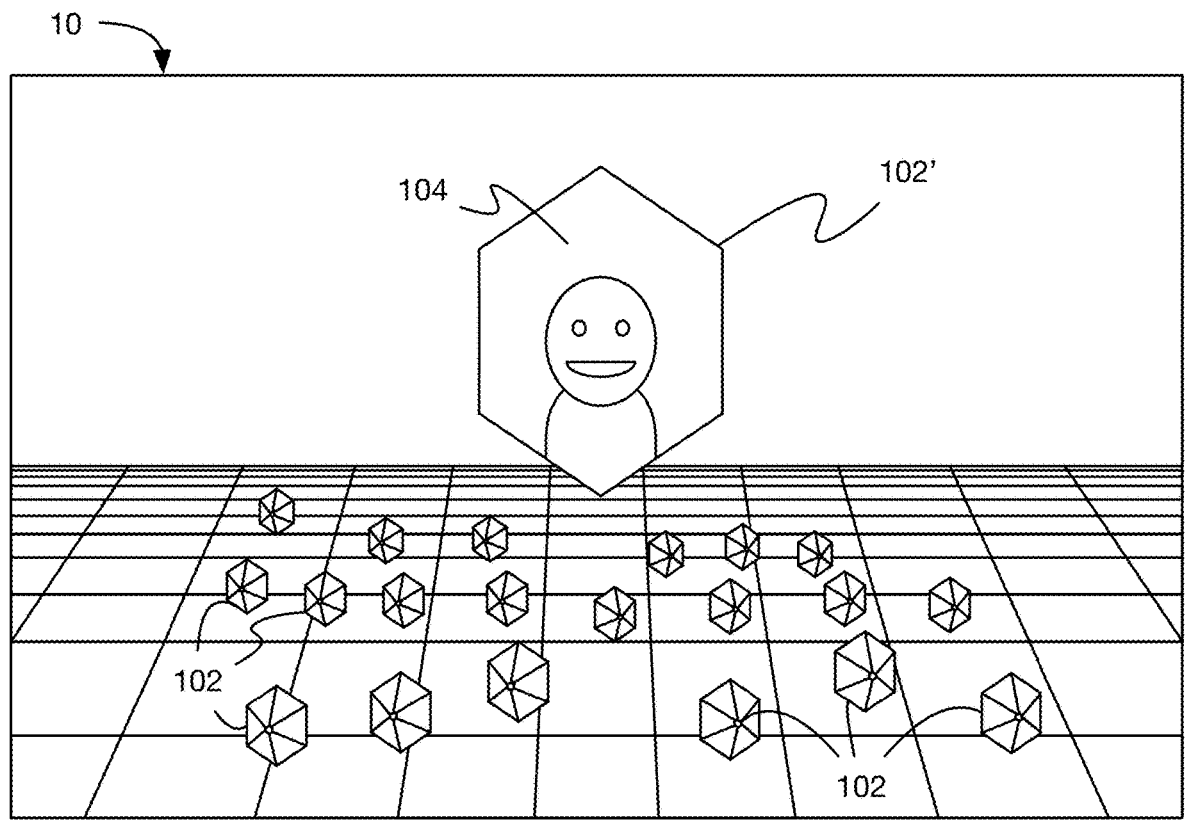
FIG. 1M is an illustration of a presentation mode for a teleconferencing virtual environment, according to some implementations.

As discussed above, virtual avatars 108 may be scaled to any size in order to provide audio to users over a large region. In a similar implementation, an avatar 102 of a user may be scaled to a very large size in order to communicate with a large number of users simultaneously in a presenter or "god" mode. FIG. 1M is an illustration of a presentation mode for a teleconferencing virtual environment, according to some implementations, with a first user's avatar 102' and video stream 104 scaled to a very large size. Other users corresponding to other avatars 102 around the environment may be able to easily see the first user's avatar 102' and video stream 104, allowing the first user to communicate with everyone simultaneously. In some such implementations, the attenuation of the first user's audio stream based on distance to viewers may be disabled or reduced in such modes, allowing their audio to extend across the entire environment to broadcast to all other users that are present. Similarly, in some such implementations, resolution or bitrate downscaling for the first user's video stream may be disabled regardless of distance of the viewer. Users may dynamically scale the size of their avatar up and down in some implementations, allowing the presenter mode to be handed off between users, while still allowing for other users to have distinct and non-interfering sub-conversations. This may be useful for conferences or lectures, as well as concerts, viewing parties, or other such functions.

In some implementations, a video filter may be applied to remove a background from the user's camera feed. In a further such implementation, the borders or surfaces of the avatar 102 may be hidden or not displayed, such that just the view of the user's face and/or body from their camera is displayed rather than a polygon or other visual identifier. This may be particularly useful for presentations or performances, as discussed above in connection with FIG. 1M.

In the example illustration of FIG. 1M, the primary user or performer is in front of many other users or viewers. In some implementations, users may naturally navigate into appropriate viewing positions as desired, while in other implementations, users may be automatically placed in predetermined positions (e.g. distributed into a theater seating-like array in front of the speaker, performer, or presenter). Other arrangements may be utilized for various events, including stadium seating (e.g. users are placed in a stadium seating array around a central area for one or more performers or presenters); classroom seating; dynamic subgroupings (e.g. randomly pairing users together face to face in a speed dating-like mode; generating clusters or breakout groups of any number of users, such as 2, 3, 4, 5, or more; networking mode in which users are randomly grouped for a designated period of time, and then reshuffled into new groups); or any other such arrangements. In such implementations, virtual cameras and avatars may be automatically repositioned by the system (e.g. by changing stored positions and directions for each avatar according to predetermined arrangements or dynamically generated arrangements).

Figure 1N:
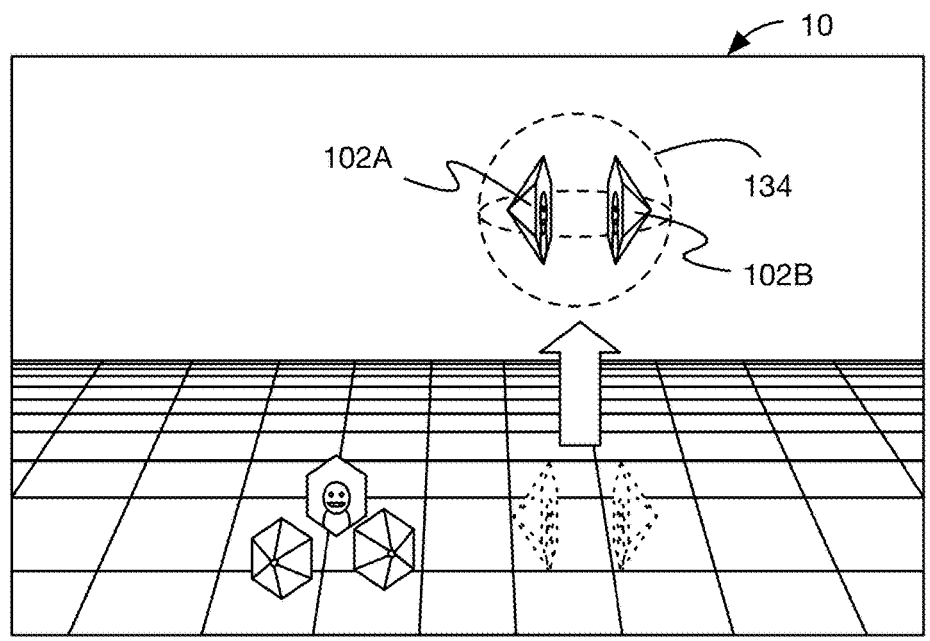
FIG. 1N is an illustration of a privacy mode for avatars in a teleconferencing virtual environment, according to some implementations.

As discussed above, in many implementations, subgroups of users may move their avatars to a separate position in the virtual environment to have a more private conversation or reduce noise from other users. In a further implementation, a privacy mode may be utilized to both completely attenuate or eliminate conversations from others as well as providing privacy for the subgroup of users, and may be displayed via a visual cue such as a "bubble". FIG. 1N is an illustration of a privacy mode for avatars in a teleconferencing virtual environment, according to some implementations. As shown, a pair of avatars 102A, 102B may move to a separated location from other avatars and activate a privacy mode to enter a private audio space. In some implementations as illustrated, a semi-translucent privacy bubble 134 may be rendered around the avatars 102A-102B and the avatars may be floated off the floor of the environment to a distinct position. While in the privacy mode or bubble, audio streams corresponding to the avatars 102A-102B may not be streamed to other users' computing devices, and vice versa. In some implementations, audio streaming to others may be disabled, while in other implementations, an attenuation threshold distance may be set at the boundary of the bubble with audio attenuated completely beyond that distance. Upon exiting the privacy mode, in some implementation, the bubble or other visual effect may dissipate or burst and the avatars may float back to the floor of the environment. Advantageously, these implementations provide a visual cue for other users that the users within the privacy mode are present and communicating but are occupied.

In some implementations, a virtual environment may be limited to a predetermined number of active users or avatars, to constrain bandwidth and/or processing requirements. In some such implementations, once the environment has reached the predetermined number of active users, additional users may partially participate as spectators, or avatar-less users. Such spectator participants may receive audio and video streams, allowing users to watch and listen to active users, but may not provide their own media streams. In some such implementations, spectator participants may elect to receive a duplicate of another user's received stream (e.g. from the same virtual camera associated with an active user). This may allow spectating users to follow the stream from the point of view or perspective of the selected active user and may be particularly desirable for multiplayer games or other events with celebrities or star players. In some implementations, spectators may elect to switch between a first person view (e.g. viewing through the same virtual camera as the selected user as discussed above); a third person view (e.g. viewing through a virtual camera at a predetermined displacement from the virtual camera and avatar of the selected active user, e.g. behind and slightly above the avatar); or an independent view. For example, in some such implementations, spectator participants may be associated with their own virtual cameras, with independent control over the camera's direction and/or zoom within the virtual environment.

Figure 1O:
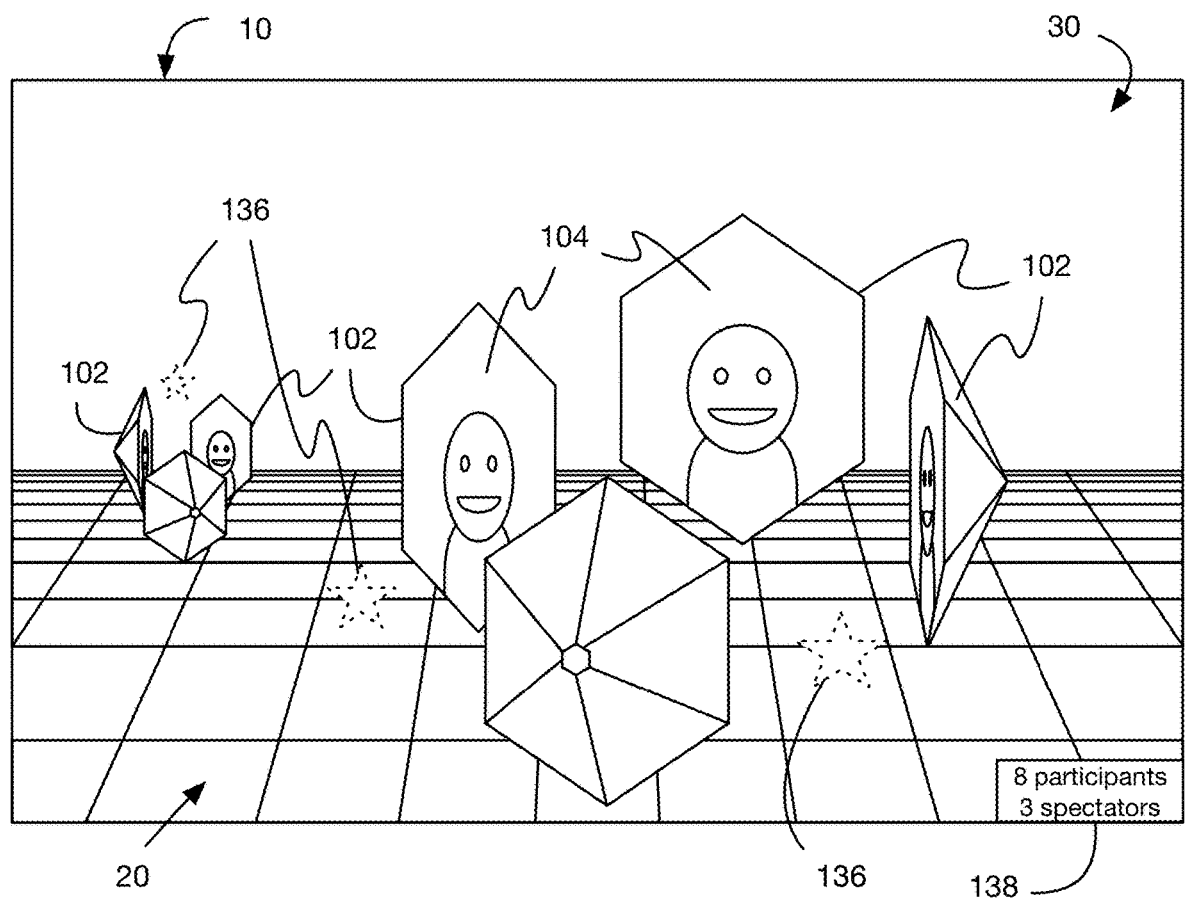
FIG. 1O is an illustration of a spectator mode for avatars in a teleconferencing virtual environment, according to some implementations.

In some implementations, the virtual camera for a spectator may be fixed to a selected active avatar (e.g. as a "ride-along" camera), while in other implementations, spectator participants may also control their virtual camera's position within the virtual environment. In some implementations, the virtual camera may be represented to others within the environment, e.g. as a partially transparent avatar, a pixel cloud, a floating light, or any other such representation, allowing others to see that there are spectators present, while not blocking the view of active users. For example, FIG. 1O is an illustration of a spectator mode for avatars in a teleconferencing virtual environment, according to some implementations. In addition to active avatars 102 displaying video streams 104, spectator avatars 136 may appear as ghosted icons within the environment without a corresponding video stream 104. This may enable large numbers of spectators to join the virtual environment, with minimal strain on bandwidth and processing resources. In some implementations, a counter 138 may display numbers of active participants and/or spectators within the environment. In a similar implementation, a counter may be displayed to an active user identifying a number of spectators viewing their virtual camera or stream or riding along with their avatar, as discussed above. The system may utilize social networking features to allow users to "follow" other users, receive notifications when users have joined a virtual environment, etc.

In some implementations, active users may communicate with spectators viewing their stream or riding along with their avatar, either via a text-based chat stream or via a "local" microphone or audio feed that is not redistributed to other active users or spectators. For example, in some such implementations, in response to a trigger (e.g. a push-to-talk-locally button, key command, gesture, command word, etc.), an audio and/or video stream captured by a user's microphone and/or camera may be distributed only to spectator users following that user, rather than other active users and/or spectators within the virtual environment or session. This may allow for a private communication with followers without disturbing others in the session.

In some implementations, if an active user leaves the session or environment, a spectator user may be automatically "promoted" to being an active user (e.g. activating a video camera to provide a video stream 104, etc.). In other implementations, active users may be selected by a session host or administrator and spectators may not be automatically added as active users (e.g. for multiplayer games or other events with predetermined teams).

Figure 1P:
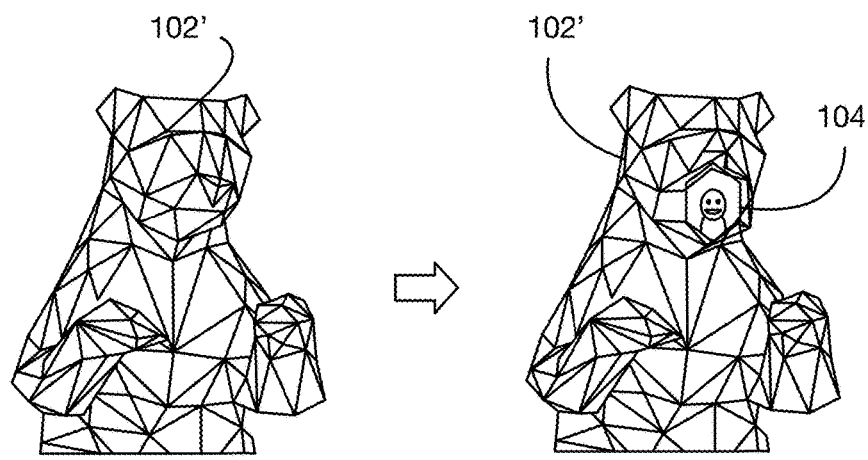
FIG. 1P is an illustration of dynamic avatars in a teleconferencing virtual environment, according to some implementations.
Figure 1Q:
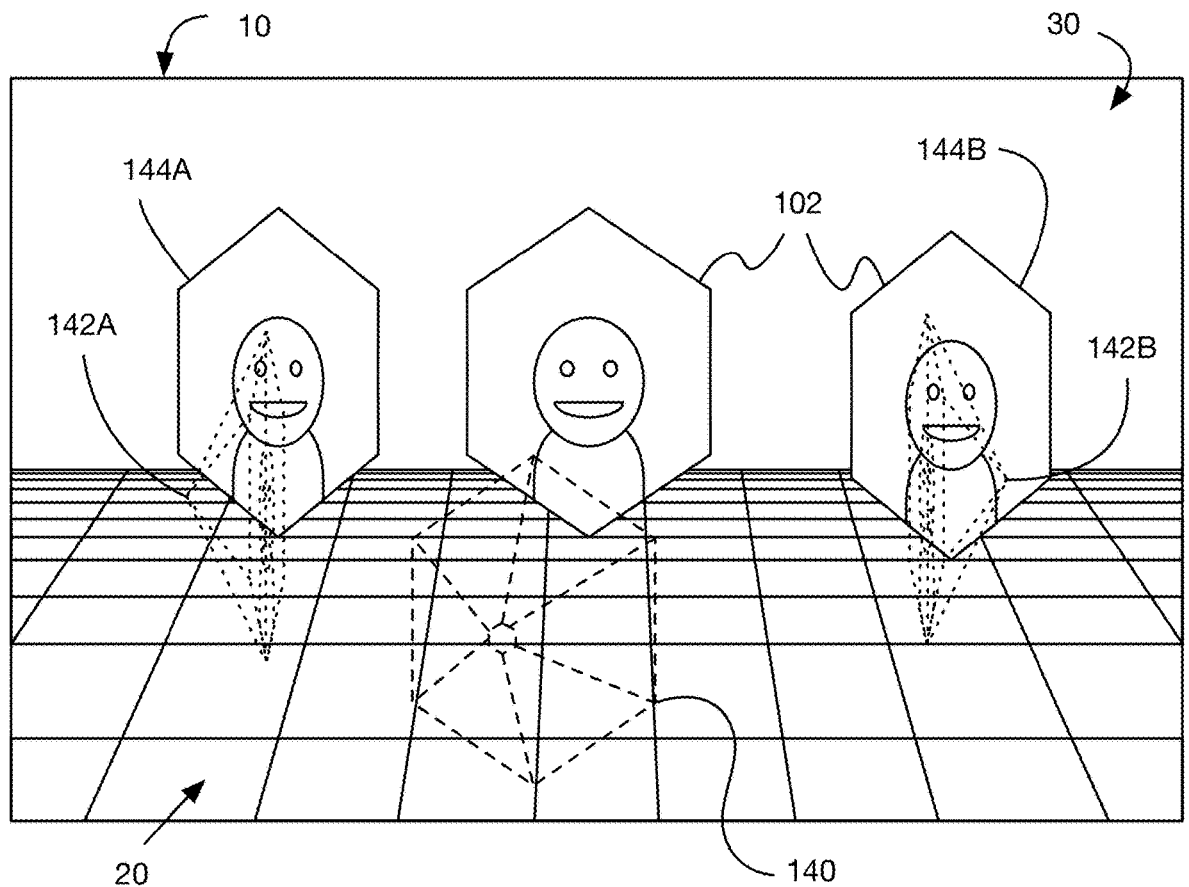
FIGS. 1Q and 1R are illustrations of a front view and top view, respectively, of dynamically adjusting avatar positions for conferencing in a virtual environment, according to some implementations.
Figure 1R:
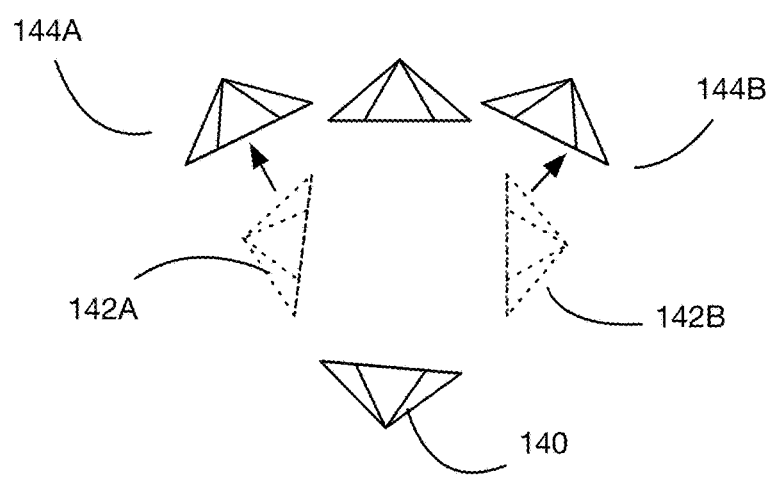
Figure 1S:
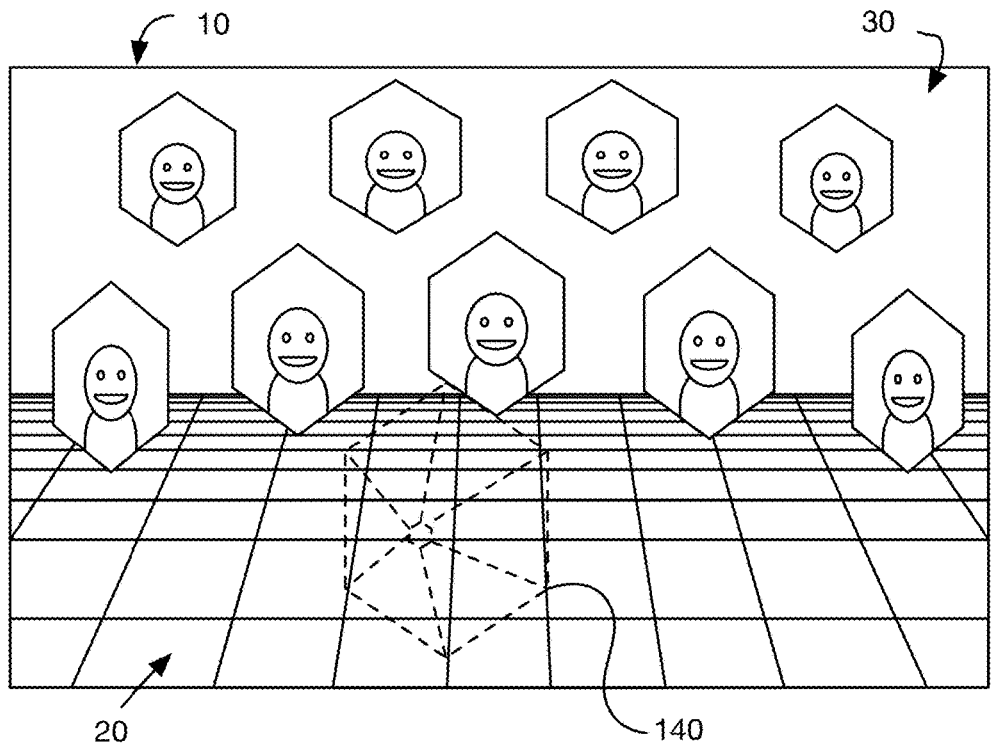
FIG. 1S is an illustration of another implementation of dynamically adjusting avatar position for conferencing in a virtual environment.
Figure 1T:
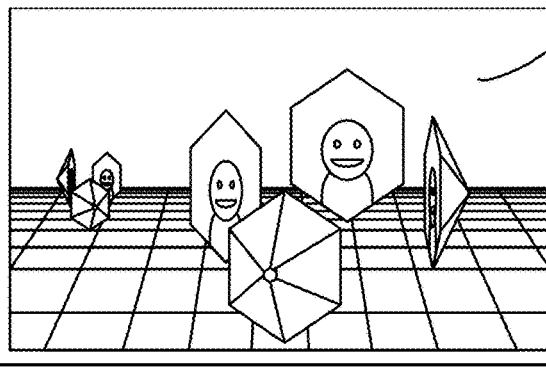
FIG. 1T is an illustration of a web page comprising an embedded virtual camera for a virtual environment, according to some implementations.

Although primarily discussed in terms of spectator users, a similar function may be utilized to echo or rebroadcast a user's view of the virtual environment to another service, such as a social media provider that provides live streaming video (e.g. YouTube, Twitch, Instagram Live, Facebook Live, or any other such provider), website host, or other service. For example, referring briefly ahead to FIG. 1T, illustrated is a web page 146 comprising an embedded virtual camera 148 for a virtual environment, according to some implementations. The view of the virtual camera 148 may echo the view seen by the user (e.g. by receiving a processed video stream retransmitted from the computing device of the user, and/or by receiving an identical video stream from a video conferencing server of the virtual environment as discussed below). In some implementations, audio streams may be similarly duplicated and provided to viewers of the live streams and/or web pages with embedded virtual camera. The audio streams may be similarly retransmitted from the computing device of the user, and/or regenerated or processed by the server providing the embedded stream (e.g. an application server, virtual server executing a spectator agent, etc.). In some implementations, users may similarly share screenshots from within the virtual environment directly to social media services.

As discussed above, in some implementations, virtual cameras of spectators may be attached or pinned to an avatar of an active user, allowing the active user to lead the virtual cameras around the environment. In a similar implementation, other active users may pin their avatar to another active user's avatar, allowing the latter to similarly lead them around the environment. Other avatar-avatar interactions are possible, including bouncing off avatars (e.g. providing an acceleration away from another avatar when detecting a collision, etc.).

While primarily discussed in terms of polygonal prism avatars, in some implementations, avatars may have more complex forms, which may be dynamically animated. For example, FIG. 1P is an illustration of a dynamic avatar 102' in a teleconferencing virtual environment, according to some implementations. The avatar 102' may have various animations, such as a bear scratching, sitting up, or stretching, which may be manually controlled by the user (e.g. via a key command) or may be automatically selected by the system periodically (e.g. playing a different animation every 30 seconds, or any other such time). Such animations may also have associated sound effects in some implementations. To associate the avatar with the user, in some implementations, the user's video stream 104 may be presented as part of the avatar. For example, in the illustration of FIG. 1P, when the bear opens his mouth, the video stream 104 of the controlling user is displayed. This may be triggered manually by the user, automatically in response to detecting speech, etc. Other avatar shapes may be dynamically selected and utilized within the virtual environment. Although shown with an entire torso and a relatively smaller video region, in some implementations, just a head may be shown (and accordingly larger), with a similarly larger video region.

While implementations of the virtual environment discussed herein are three-dimensional and surround users, in many instances, users may be accessing or viewing the environment via a display that does not provide wide viewing angles. For example, many users may view the environment on a desktop or laptop computer with a monitor that fills 90 degrees or less of the user's field of view. When groups of users gather within the virtual environment, they may naturally form a circle to allow everyone to see everyone else. However, as the number of people in the group grows and the circle grows correspondingly, one's neighbors within the circle may be outside of the limited field of view of the user's monitor. This forces users to constantly be rotating left and right to carry on a conversation, which may be awkward and frustrating.

Instead, in some implementations, when forming a group, virtual positions of other avatars may be dynamically adjusted for each user with offsets to keep each other avatar in view. For example, FIGS. 1Q and 1R are illustrations of a front view and top view, respectively, of dynamically adjusting avatar positions for conferencing in a virtual environment, according to some implementations. Referring first to FIG. 1Q, the illustration shows four avatars arranged in a box or at cardinal positions around a circle, with the view from the position of the closest avatar 140 (shown in dashed line). The "real" positions of the avatars to the left and right are shown in dotted line as positions 142A and 142B. As these positions may be beyond the field of view of a monitor of a user associated with avatar 140, the system may dynamically adjust the left and right avatar positions to be slightly farther away (e.g. positions 144A and 144B) such that they would likely be within the user's monitor's field of view. FIG. 1R illustrates this dynamic adjustment from a top view, with the avatar at position 142A moved to position 144A, and the avatar at position 142B moved to position 144B. As shown, in many implementations, the facing directions of the avatars may be modified to point towards the viewing avatar 140.

These adjustments may be applied on an individual client or user level, such that each user participating in the group sees an optimal view. For example, while the left and right (e.g. "west" and "east") avatars in the example illustrations of FIG. 1Q are moved away (e.g. "north") for the client device corresponding to avatar 140, a similar adjustment may be made for each other client device within the group (e.g. for the "east" client device, the avatars to the "south" and "north" may be moved away to the "west"; for the "north" client device, the "east" and "west" avatars may be moved away to the "south", etc.). Accordingly, each client device may view an optimized view with the remainder of the group compressed in space to accommodate a narrower field of view. Because these adjustments are applied on a client-by-client basis as "virtual" position offsets, a user outside the group would see no change (e.g. they would still see the avatars in an evenly spaced circle or box of their original positions). This avoids the need to come up with a single optimized positional arrangement that works for every user around the circle, by instead creating view-optimized arrangements for each user.

While avatar visual positions are adjusted, in many implementations, audio processing does not need to be modified, as the actual positional offsets are relatively small. In other implementations, the audio processing may be modified to be based on the new adjusted positions of each avatar (e.g. panning sources that were previously to the left and right to be closer to the center).

To generate these groups, in some implementations, when multiple users or avatars are close together for a predetermined amount of time, they may be prompted to start a social circle. Accepting automatically positions the users or avatars into an evenly spaced arrangement around a circle, with virtual offsets then applied for each client as discussed above. Users may still manually control their avatar and virtual cameras to look around, but if they leave the circle, in many implementations, their view may return to normal (e.g. virtual position offsets are reset) and the spacing of positions of other avatars around the circle may be adjusted to account for the departure. In some implementations, if more users join than may comfortably fit in a circle, the system may move them into a second rank or level. FIG. 1S is an illustration of one such implementation of dynamically adjusting avatar position for conferencing in a virtual environment, with additional avatars shown floating in a second layer above avatars on a first layer (e.g. offset from the lower level for tighter packing, in some implementations as shown). This stacking may continue until a geodesic dome is formed, in some implementations. Virtual position offsets may still be applied, such that each client may see all of the other participants, regardless of where or in what layer of the social circle they are on.

In some implementations, additional effects or entities may be utilized with the virtual environment. For example, in some implementations, game play may be provided within the virtual environment, such as virtual soccer balls for avatars to "kick" around or other objects to be interacted with. In some implementations, users may be able to control the virtual environment or objects in the environment, including creating or destroying virtual objects, causing virtual "earthquakes" (e.g. causing the virtual cameras of users to shake), applying physics changes to the environment (e.g. changing the virtual environment from one with gravity to one with reduced or no gravity), or freezing users (e.g. preventing another user from rotating or translating their avatar). In some implementations, users may engage in "skywriting" within the environment, typing a message and having it dynamically animated via a smoke trail from their avatar. In some implementations, to allow users to "find" each other within the virtual environment, which may include dozens or hundreds of users and avatars or more at any given time, a user may generate a virtual flare or beacon within the virtual environment, which may be presented as shooting up from their avatar, either into the sky or to a particular person or target (e.g. a friend they wish to meet with). For example, a user may select an in-session user's account from a list, and the system may show a beacon or flare shooting across the virtual environment from the position of the selected user's avatar to the user's virtual camera or avatar. In some implementations, the user may select to accept the beacon, and the system may automatically move their avatar across the environment (e.g. following back along the path of the beacon or flare) to the selected user's avatar, or along a path to the selected user's avatar through the environment, where they may meet and interact with other users or avatars along the way.

Although primarily discussed in connection with live interactions and environments, in some implementations, the system may allow for capture of videos or still two-dimensional or three-dimensional images for separate sharing via a social network, email, or other such systems. For example, a user may capture an image or video of the virtual camera corresponding to their avatar (e.g. what the user sees), an image or video from a virtual camera in front of the user (e.g. a selfie), an image or video from a virtual camera above and behind the user (e.g. a third-person view), or any other such location. In some implementations, an interactive object may correspond to a virtual camera for capture of an image or video, such as an interactive "photo booth". The user may move their avatar in front of the object and interact with it (e.g. click on the object) to capture an image or video (e.g. of a predetermined length, or manually starting and stopping the video in various implementations) from the perspective of the virtual camera corresponding to the object. This may also be used for more detailed content creation; in some such implementations, the system may instantiate multiple virtual cameras at the direction of a user for recording video from different positions or orientations (e.g. a multi-camera setup). This may be utilized for recording interviews with other users (e.g. one camera facing both avatars and two cameras, each aimed at one avatar for close-up shots), or other such interactions.

In some implementations, the virtual cameras may be configured to follow a predetermined path or with specified timings (e.g. keyframes or points along a path at given times). In some implementations, visual filters may be applied to virtual cameras, such as color correction or shifting, modifying focal depth, brightness, contrast, or other visual aspects. Similarly, audio may be recorded along with videos, and in some implementations, audio effects or filters may be applied (e.g. equalization, gating, etc.).

Additionally, because the virtual cameras are elements of the virtual environment, in some implementations, recorded images or videos may be re-recorded or edited afterwards. For example, the system may record audio and video feeds from each user and positions and orientations of avatars, and may replay these recorded audio and video feeds at a later time, re-generating the avatars and their movements. Virtual cameras placed in the environment may be moved to different positions or orientations during different instances of playback. For example, if a pair of users record an interview from a first virtual camera position, and later determine that another position would look better, the recorded video and audio from each user and their avatar positions may be replayed and the users may move the virtual camera to a new position for re-recording the interview, without requiring the users to recreate their dialogue. Accordingly, the system may allow for dynamic re-editing of video without requiring new takes. In many implementations, the system may provide tools for editing recorded videos, audio, or images, such as scaling or clipping images or video, adjusting the length of recorded segments, moving segments within a timeline, etc.

Although discussed primarily in terms of a single virtual environment, in many implementations, multiple virtual environments may exist. Users may select different environments to dynamically switch or travel between the environments. Each environment may have a different appearance (e.g. different skybox images or art, different structures or virtual objects) and/or different characteristics (e.g. higher or lower gravity or friction, or other such features).

Figure 2A:
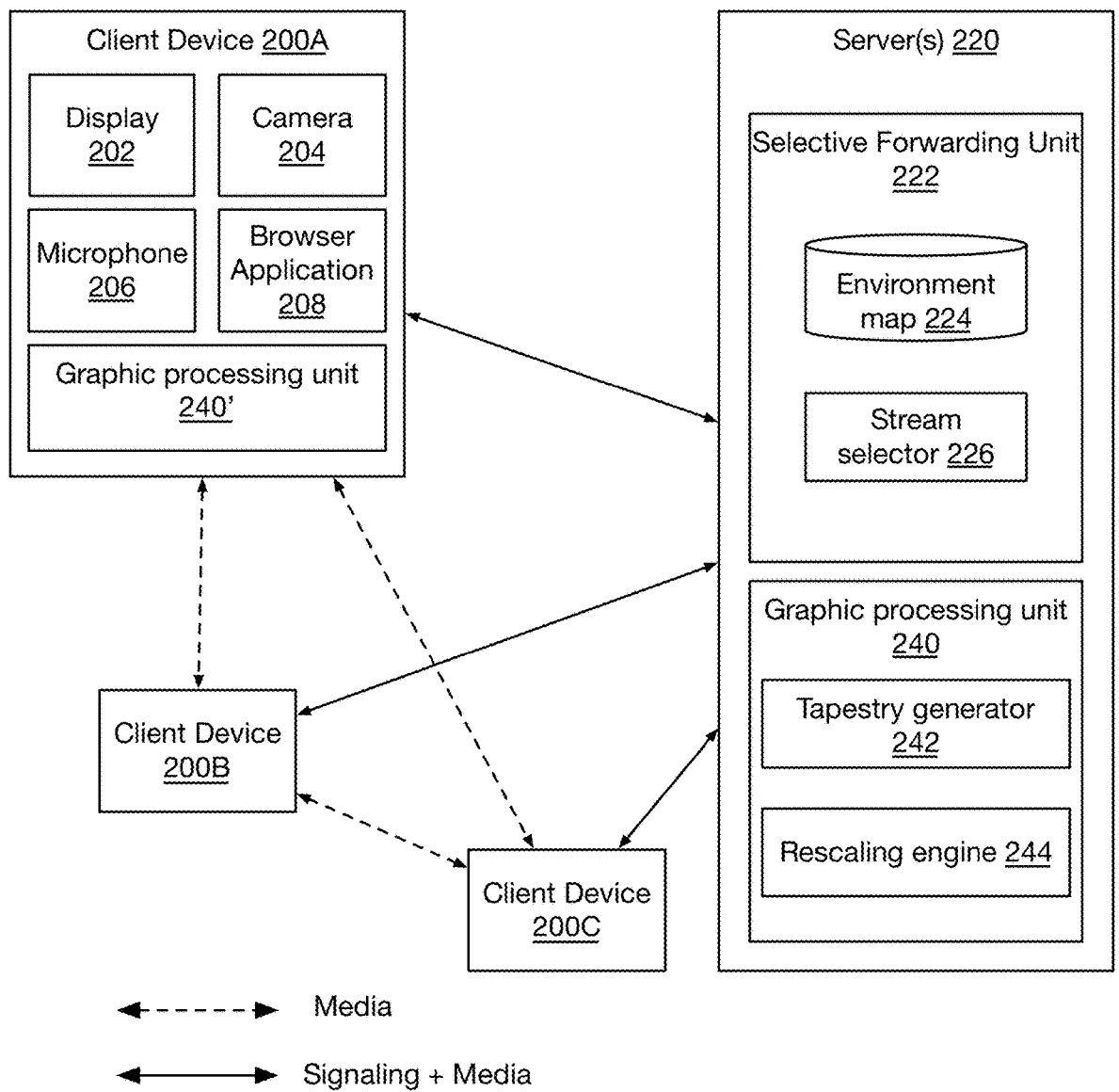
FIG. 2A is a block diagram of a system for a teleconferencing virtual environment, according to some implementations.

FIG. 2A is a block diagram of a system for a teleconferencing virtual environment, according to some implementations. A plurality of client devices 200A-200C (including additional client devices not illustrated, and referred to generally as a client device 200) may connect via a network to a server 220. Client devices 200 may comprise laptop computers, desktop computers, smartphones, tablet computers, wearable computers, appliances, or any other type and form of computing device and may be associated with a user. In some implementations, client device 200 may comprise a virtual machine executed by one or more physical computing devices.

Each client device 200 may comprise a display 202, which may include a monitor, stereoscopic or virtual reality headset, or other such display. Each client device 200 may comprise or communicate with one or more cameras 204, such as a front facing camera, web camera, stereoscopic camera, light field camera, depth camera, or other such camera or cameras for capturing a video image of a user and, in some implementations, for tracking a position of the user. Such cameras 204 may be internal to the client device 200 or may be connected to the client device, e.g. via a USB connection. Each client device 200 may also comprise one or more microphones 206 (including a stereo array of microphones in some implementations), such as a condenser microphone, dynamic microphone, ribbon microphone, piezoelectric microphone, or other such microphone. In many implementations, microphone 206 may be external to the client device, such as a headset microphone, microphone on a stand, microphone integrated into an external camera 204, etc. Client device 200 may comprise additional components not illustrated, including processors (including central processing units or CPUs, graphics processing units or GPUs, tensor processing units or TPUs, or other such co-processors or specialized processors), speakers or headphones, memory devices, network interfaces, input devices such as mice, keyboards, joysticks, touchpads, handheld controllers, or any other such devices.

Client devices 200 may execute a browser application 208, which may comprise an application, server, service, daemon, routine, or other executable logic for receiving and encoding media streams from a camera 204 and microphone 206; transmitting the media streams to a server 220 and/or other client devices 200; receiving media streams from server 220 and/or other client devices 200; and rendering the received media streams with avatars in a virtual environment. In many implementations, browser application 208 may comprise a web browser and may include a plug-in or native functionality for providing real-time communications (e.g. webRTC or similar protocols).

Client devices 200 may communicate with each other and/or with server 220 via one or more networks (not illustrated) including local area networks (LANs) or wide area networks (WANs) such as the Internet. Such networks may comprise one or more additional devices, including gateways, firewalls, switches, routers, accelerators, access points, or other such devices. In many implementations, discussed in more detail below, client devices may have a local IP address on a local area network that is translated via network address translation (NAT translation) by a switch or router connected to a wide area network to a public IP address. In some implementations, to provide peer-to-peer connectivity between client devices 200 without manual configuration, client devices 200 may communicate with a server, sometimes referred to as a Session Traversal of User Datagram Protocol Through Network Address Translators (STUN) server (which may be provided by server 220 or another server), which may provide the client device and/or other client devices with the public IP address of the client device, to allow client devices to connect directly.

Server 220 may comprise one or more computing devices, including desktop computers, workstations, rackmount servers, blade servers, appliances, clusters of appliances, or other such computing devices. In many implementations, server 220 may comprise one or more virtual machines executed by one or more physical machines and deployed as a cloud of servers. Server 220 may comprise one or more components not illustrated including processors, memory devices, displays, input/output devices, network interfaces, or other such devices.

In some implementations, server 220 may execute a selective forwarding unit 222. Selective forwarding unit 222 may comprise an application, server, service, daemon, routine, or other executable logic for communicating signaling information to and from client devices 200, and receiving from and selectively forwarding media streams to client devices 200. In some implementations, selective forwarding unit 222 may comprise a webRTC server or similar protocol server for real time communications.

Selective forwarding unit 222 may be configured to establish communication sessions with client devices 200 participating in a teleconferencing virtual environment. Establishing such sessions may comprise performing handshaking, authentication, synchronization, exchanging of encryption keys, or other such features, including in some implementations gathering device information or capabilities (e.g. connection bandwidth, video capabilities, etc.).

Selective forwarding unit may comprise a stream selector 226, which may comprise an application, service, server, daemon, routine, or other executable logic for selecting audio and video streams to provide to other client devices. As discussed above, in some implementations, server 220 may act in a spoke-and-hub configuration, receiving media streams from each client device 200 and forwarding the streams to one or more other client devices. Forwarding every media stream to every other device may require substantial bandwidth and processing power, so accordingly, in some implementations, a stream selector 226 may select, via a stream selector 226, which streams to provide to a client device 200. For example, in some implementations, a first client device 200 may provide a first video stream and first audio stream to server 220. In some implementations, server 220 may transcode the video stream and/or audio stream into alternate resolutions and/or bitrates (e.g. transcoding a high resolution stream into a lower resolution stream to utilize less bandwidth, scaling the stream, reducing a bit depth of the stream, compressing the stream, reducing a frame rate or sample rate of the stream, etc.). Rather than providing the high definition stream to each other client device, selective forwarding unit 222 may provide the high definition stream to other client devices corresponding to avatars that are nearby an avatar corresponding to the first client device in the virtual environment; and may provide the lower resolution stream to other client devices corresponding to avatars that are farther away. Particularly for large environments with large numbers of client devices distributed throughout the environment, this may result in significant bandwidth reduction. As users move avatars within the environment, the positions (and in some implementations, orientations) of their avatars may be provided to the selective forwarding unit 222 and stored in an environment map 224. The stream selector 226 may consult the environment map to determine which client devices should receive which streams, and may dynamically reselect streams as avatars are moved within the environment. Similarly, in some implementations, the stream selector 226 may select which audio streams to provide to which client devices, e.g. based on relative positions and distances or privacy settings as discussed above.

Although discussed above in terms of server-side transcoding, in many implementations to reduce processing requirements on the server, client devices 200 may transcode locally captured video and/or audio and provide a plurality of media streams to the server (e.g. a high resolution video stream, a high quality audio stream, a medium resolution video stream, a low resolution or low frame rate video stream, a heavily compressed audio stream, etc.). The stream selector 226 may select which audio and/or video streams to provide to other client devices. While this may require more upstream bandwidth from each client device and more downstream bandwidth at the server, this may significantly reduce processing requirements for large numbers of devices connected to the virtual environment.

In some implementations, to further reduce bandwidth and/or processing requirements at the server, client devices 200 may communicate media streams between each other directly, without the streams traversing the server 220. For example, server 220 may direct a first client device 200A to retrieve a selected video and/or audio stream from a second client device 200B at a specified address, and/or may direct the second client device 200B to transmit the selected video and/or audio stream to the first client device 200A at another specified address. The client devices 200A-200B may then communicate directly to transmit and receive the video and/or audio stream until otherwise directed by server 220 via signaling communications, or termination of a session by a browser application 208.

Figure 2B:
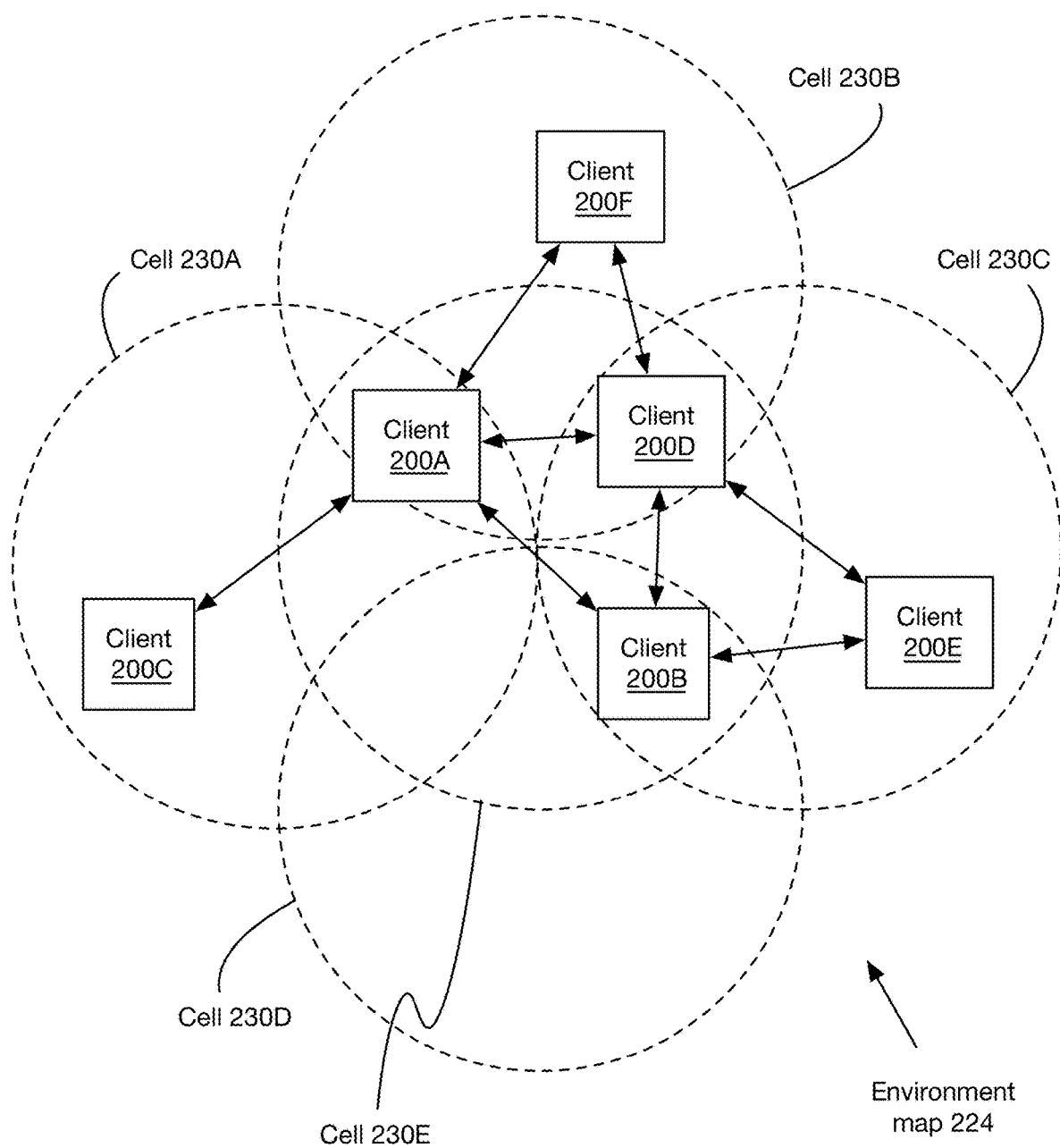
FIG. 2B is an illustration of cells of an environment map for stream selection in a teleconferencing virtual environment, according to some implementations.

Environment map 224 may comprise a database, array, or other data structure for storing identifications of connected client devices and/or users and the positions and, in some implementations, orientations of corresponding avatars within a three dimensional virtual environment. In some implementations, environment map 224 may be used for selecting which audio or video streams should be provided to which client devices, by utilizing a plurality of overlapping logical "cells" within the environment and providing to a client device audio and video streams of other client devices that are in the same cell or a neighboring cell. For example, FIG. 2B is an illustration of cells 230A-230E of an environment map for stream selection in a teleconferencing virtual environment, according to some implementations. Example positions of avatars of client devices 200A-200E within the environment and relative to cells 230A-230E are illustrated. Although shown visually, in many implementations, as discussed above, environment map 224 may comprise a database or array, and accordingly, cells may be defined by center locations and radius lengths, and a client device may be located within a cell by comparing a distance between its coordinates and a cell's center coordinates to the radius (e.g. $\sqrt{[(x_{client}-x_{cell})^2+(y_{client}-y_{cell})^2]}<\text{radius}_{cell}$, or similar methods). In the example shown, avatars of client 200A and client 200C are within cell 230A; avatars of clients 200A, 200B, and 200D are within cell 230E; and avatars of clients 200A and 200F are within cell 230B. Accordingly, in some such implementations, the stream selector may provide client 200A with video and audio streams from clients 200B, 200C, 200D, and 200F and vice versa (with media exchanges shown with arrowed lines). Client 200E does not share any cells with client 200A and thus may be considered out of range. In some implementations, client 200A may receive a low resolution version of a video stream from client 200E. Similar connections may be determined for other clients as shown.

In other implementations, a cell model may not be utilized, and instead streams may be selected by calculating distances between client device avatars and comparing the distances to a threshold. In a further implementation, multiple thresholds may be utilized to provide some hysteresis and prevent connecting and disconnecting streams as an avatar repeatedly crosses a threshold (e.g. an inner distance threshold within which client devices are connected, and an outer distance threshold beyond which client devices are disconnected, such that a device is not connected until its avatar passes the inner threshold on the way in, and not disconnected until it passes the outer threshold on the way out). In a still further implementation, thresholds may be dynamically adjusted based on a client device's avatar's speed within the virtual environment (e.g. expanding thresholds when speed is higher, allowing connections to be established as client avatars approach each other). In some implementations, streams may not be disconnected (to reduce reconnection overhead of the connection); rather, when beyond the distance thresholds or out of a shared cell, a client device may be provided with a very low bitrate stream (e.g. near 0 kbps), such that the connection is maintained at an absolute minimum of data.

In another implementation, the cell model of FIG. 2B may be used to switch between a hybrid peer-to-peer connection model and the selective forwarding model. In such implementations, if a cell is "dense" or includes a number of client device avatars above a threshold, then the server may handle scaling and selection or mixing of streams as discussed above using the selective forwarding model. This may require more server processing, memory, and network resources, but allows handling of large numbers of simultaneous client devices. If instead a cell is "sparse" or includes a number of client device avatars below the threshold, then the client devices may be directed to provide audio and video streams directly to each other using a peer-to-peer model. This may reduce the resources required of the server, by leveraging processing and network resources of the clients; however, due to limited client bandwidth, the peer-to-peer model may not work for dense cells. Accordingly, switching between the peer-to-peer model and selective forwarding model based on avatar density allows the system to scale to higher numbers of client devices in the environment, while reducing server costs.

Returning to FIG. 2A, upon receipt of video and audio streams, browser application 208 of the client device 200 may render the video streams on corresponding avatars within the virtual environment according to position and orientation data provided with each video stream. Browser application 208 may also mix the received audio streams into a stereo mix (or surround sound, in some implementations) according to direction-based panning and distance-based attenuation as discussed above, and output the mix to a headset or speakers for the user. In some implementations, additional processing may be applied to the audio and/or video streams, including video smoothing, scaling, up or downsampling, etc.; and audio equalization (e.g. according to a head-related transfer function, to provide 360° audio localization for a stereo headset), compression or gating, or other such processing. Additionally, in some implementations, attenuation, equalization, or reverb may be applied to audio streams based on objects or entities within the virtual environment. For example, if an avatar of a remote device is close to an avatar of the user, but a wall in the virtual environment is between the two avatars, the corresponding audio stream may be attenuated by an additional amount due to occlusion by the wall, providing greater realism. Other processing effects may be applied similarly. In some implementations, rather than calculating occlusion by walls or other objects for attenuation, users may be able to "hear" through walls in some environments, with no additional attenuation applied. In open environments with no intervening walls, this may not be an issue, and not calculating the attenuation may reduce processing requirements. In a further implementation in which multiple vertical levels exist within the three dimensional environment, to prevent users from "hearing" through ceilings and floors (which may be more intrusive or immersion breaking), additional attenuation may be applied globally based on vertical distance between avatars. For example, as avatars on the same vertical level will have the same vertical coordinates while avatars on other levels have significantly different vertical coordinates, much higher attenuation may be applied to vertical distances (e.g. −20 dB for every doubling of vertical distance) than horizontal distances (typically −6 dB for every doubling of distance). This may achieve effective attenuation between levels with limited additional processing.

Returning briefly to FIG. 2A, in some implementations, a server 220 may comprise one or more graphics processing units (GPUs). GPU hardware may provide advanced or highly efficient processing of video streams, including filtering, rescaling (e.g. increasing or decreasing resolution, frame rates, and/or bit depth), transcoding, or other such processing. In many implementations, such GPU capabilities on the server(s) may be more advanced than those available to client devices 200. Accordingly, in some implementations, the system may perform graphics processing and aggregation on the server with an aggregated video stream provided to each client device. This may reduce processing requirements at each client device, and may also reduce total system bandwidth. For example, rather than providing a video stream to a client device from every other device at full resolution, the GPU 240 may downscale video streams corresponding to avatars that are farther away from the avatar of the client device, as the corresponding avatars would be too small in the virtual environment to show higher resolution details of their video streams. This may significantly reduce bandwidth needs, particularly as the system scales.

Figure 2C:
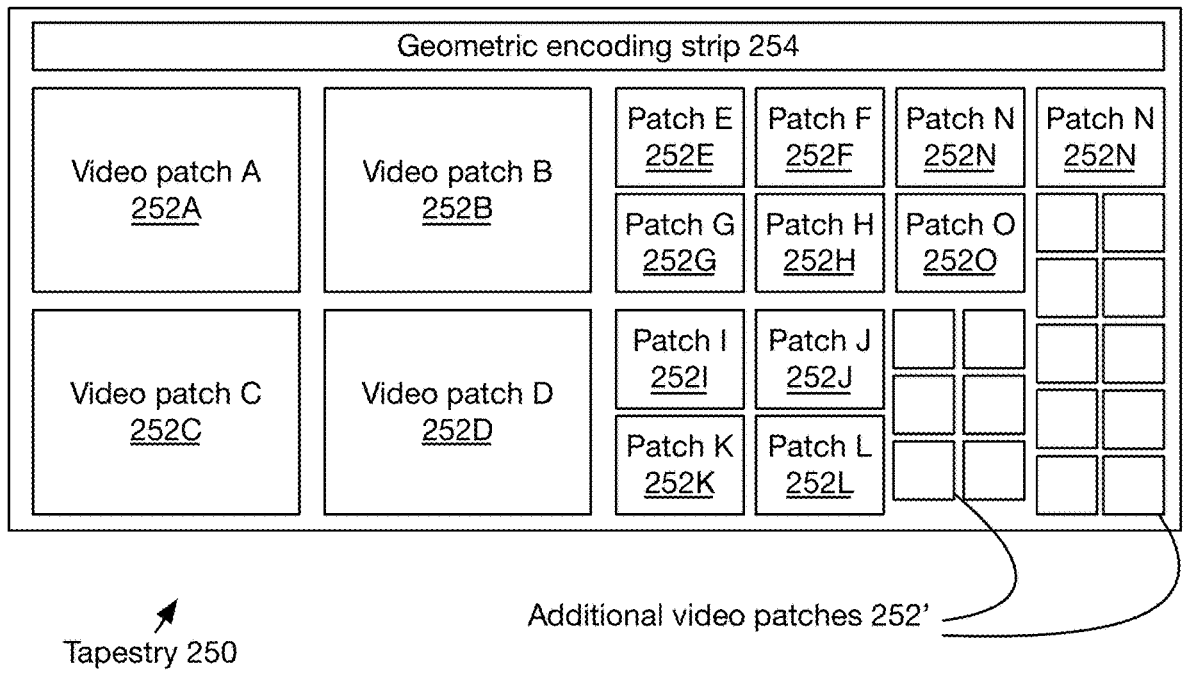
FIG. 2C is an illustration of a tapestry image for server-side aggregation of video for a teleconferencing application, according to some implementations.

Additionally, by rescaling and aggregating multiple video streams into a single aggregated stream for each client on the server, video processing may be greatly simplified on the clients. For example, in some such implementations, the rescaled video streams for each client device may be combined or tiled in a "tapestry". Referring briefly ahead to FIG. 2C, illustrated is an example of a tapestry image 250 for server-side aggregation of video for a teleconferencing application, according to some implementations. Each frame of video from a plurality of client devices may be dynamically rescaled based on their avatar's positions relative to a target client device, and the frames tiled together as "patches" 252 within the tapestry image. For example, if the system determines that four avatars are close to the target client's avatar (e.g. with distances less than a threshold), video frames from the four corresponding client devices may be added to the tapestry at full resolution (e.g. patches 252A-252D). Video frames from client devices corresponding to a second set of avatars with distances from the target client's avatar greater than the first threshold but less than a second threshold may be downscaled and added to the tapestry (e.g. patches 252E-252N). Video frames from client devices corresponding to a third set of avatars with distances greater than the second threshold may be downscaled to an even smaller size and added to the tapestry (e.g. additional patches 252'). Although only three resolutions are illustrated in FIG. 2C, in many implementations, higher levels of granularity may be utilized (e.g. more thresholds and more rescaling options, including reducing frame rates, reducing bit depth, etc.).

As discussed above, the tapestry image is specific to a target client device (though may also be provided to ride-along spectator devices in some implementations, as discussed above). For example, given a virtual environment with two groups of avatars spaced apart from each other, a client device in one group may receive a tapestry image with frames from other nearby client devices at full resolution and frames from client devices in the other group at reduced resolution; and a client device in the other group may receive a different tapestry image with frames from nearby client devices in that other group at full resolution and frames from client devices in the first group at reduced resolution. While this requires additional processing on the server to generate client-specific tapestry images, as discussed above, processing and bandwidth requirements to each client device are greatly reduced.

Furthermore, in some implementations, tapestry images may be re-used for client devices that are in close proximity to each other. In an extreme example of a virtual environment with two avatars next to each other and one distant avatar, the two client devices corresponding to the first two avatars may both receive an identical tapestry image with the video frames from those two client devices at full resolution and the video frames from the client device corresponding to the distant avatar at reduced resolution. While this means that each client device may receive, as part of the tapestry image, its own video frames, the entire tapestry image need not be displayed by the client device, as discussed in more detail below. Accordingly, for a small increase in bandwidth (e.g. providing each client device their own video feed back to them as part of the tapestry), in some implementations, processing requirements may be reduced by providing the same tapestry to all devices within a threshold proximity of each other. These implementations may work better for static groups (e.g. social circles or arrangements as discussed above).

Additionally, because the tapestry image is regenerated for each subsequent frame of video from each client device, as avatars move around within the virtual environment, getting closer or farther away, rescaling parameters may be dynamically adjusted from frame to frame. For example, a first frame from a client device corresponding to a nearby avatar may be included in a first tapestry image at full resolution, but if the avatar is moving away, a second frame from the client device may be included at a first reduced resolution; a third frame at a second reduced resolution; etc. Because this rescaling is dynamically determined for each new frame based on the positions of the avatars within the virtual environment, the system avoids resolution-switching latencies common to adaptive-bitrate streaming protocols (e.g. switching to a lower resolution substream in response to network congestion, with the resolution switch being delayed by the time it takes the client to identify the growing congestion and request and retrieve media chunks at the lower resolution). That is, the resolution of each stream is scaled based on avatar positions rather than network congestion, and thus is agnostic to changing network conditions.

Figure 2D:
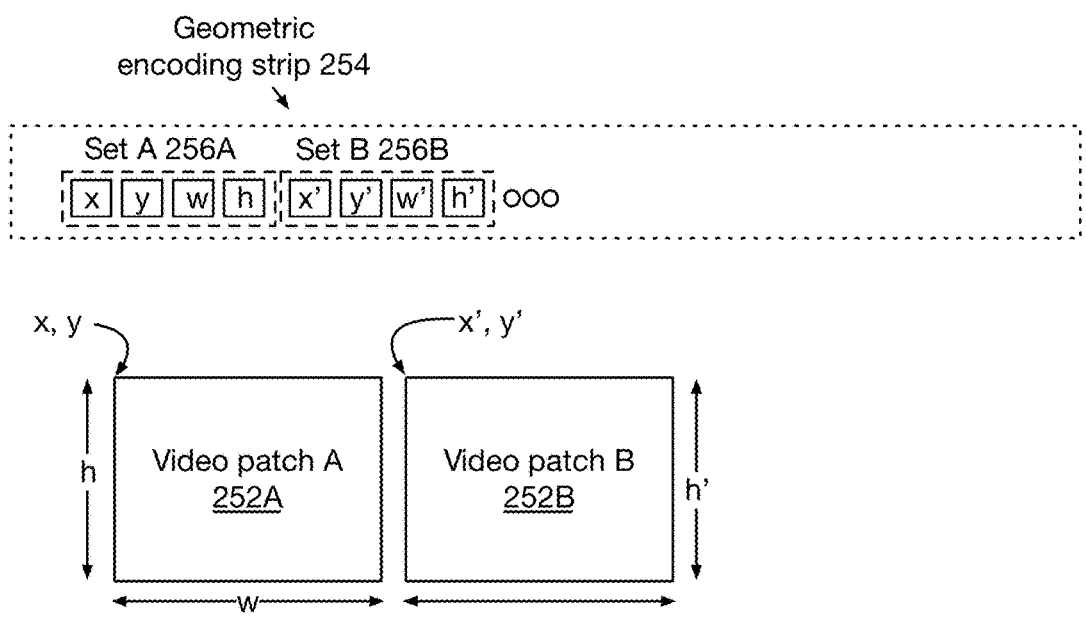
FIG. 2D is an illustration of encoded metadata for a tapestry image for server-side aggregation of video for a teleconferencing application, according to some implementations.

Because the resolution of any particular video stream may change from one tapestry image to another, the position and size of the corresponding patches may also change from one tapestry image to another. In some implementations, the geometry (e.g. position and size) metadata for each patch may be encoded within the tapestry image, such as in a geometric encoding strip 254. Referring now to FIG. 2D, illustrated is an example of encoded geometric metadata for a tapestry image for server-side aggregation of video for a teleconferencing application, according to some implementations. Each video patch may be associated with a corresponding set 256 of tuples representing the position (e.g. x and y coordinates within the tapestry image of a corner of the patch, such as a top left corner) and geometry of the patch (e.g. width and height). These tuples may be encoded as pixels in a predetermined region of the tapestry image (e.g. geometric encoding strip 254). For example, in some implementations, the tuples may be encoded as two 32-bit RGBA color texels, with x=Texel1.RG, y=Texel1.BA, width=Texel2RG, height=Texel 2BA; or any other such encoding. This requires only two texels per patch to encode 16 bits for each of x, y, height, and width data, which may be highly efficient. Other metadata need not be included in many implementations, as it may not be required for decoding and rendering of the video streams: for example, frame rates for each stream are the same, as each frame is provided by a corresponding tapestry image (in implementations with rescaling including reducing frame rates, such frames may be repeated in multiple tapestry images, for example, repeated twice for a 15 fps stream in a 30 fps tapestry).

Figure 2E:
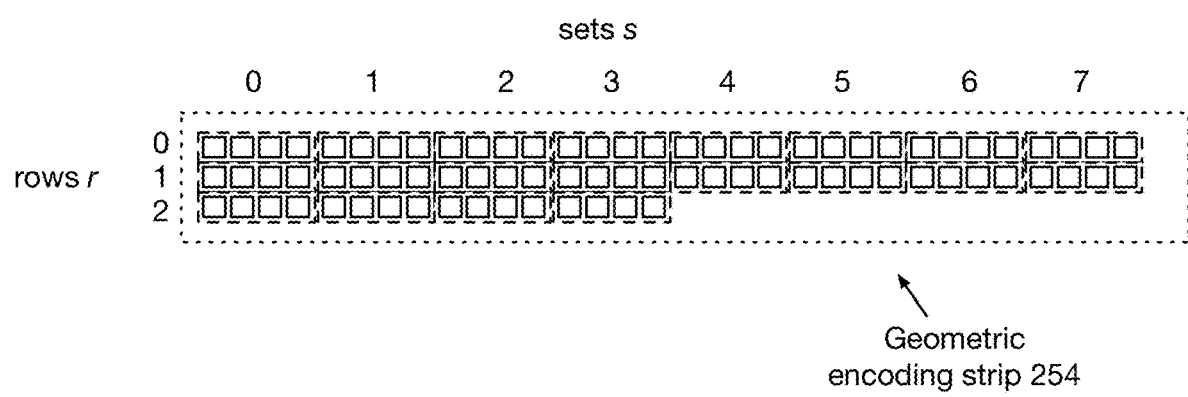
FIG. 2E is an illustration of a geometric encoding strip for a tapestry image for server-side aggregation of video for a teleconferencing application, according to some implementations.

While each texel set 256 identifies a patch 252 via its geometry, each texel set also needs to be associated with a client device and avatar. In some implementations, these associations may be encoded via additional texels (e.g. encoding, as part of each set, additional texels for client device identifiers). In other implementations, the associations may be encoded implicitly based on the ordering of the texels. For example, FIG. 2E is an illustration of a geometric encoding strip for a tapestry image for server-side aggregation of video for a teleconferencing application, according to some implementations. When generating each tapestry image, the server knows the number of active clients or avatars present in the session and thus the number of patches that will be included. The geometric strip region 254 of the tapestry image may be allocated based on this number of active clients or avatars, and may have a variable length (in sets s) and height (in rows r) (which may be encoded into the tapestry image, e.g. in a first pixel, or may be provided to the client devices separately with the tapestry image, e.g. in metadata). When processing each client's video frame and adding it to the tapestry, the corresponding client's identifier (e.g. UID, account number, account name, MAC address, or any other such identifier) may be used to select a set of texels. For example, in one such implementation, the position of the texels amongst the sets s and rows r may be determined as (set=(mod(client identifier,$), row=(floor(client identifier/r)). The geometry of the patch may be encoded into the corresponding texels.

When decoding and rendering the tapestry image, the client device may perform the same calculation. Specifically, each client device may receive, in addition to the tapestry image, data identifying the client identifiers of each avatar present (along with their position and direction information). Accordingly, the client device may similarly calculate (set= (mod(client identifier,$), row=(floor(client identifier/r)) to associate a texel pair with a particular avatar; and as the texel pair identifies a patch, the client device may render the portion of the tapestry image at the texel-encoded geometry on a face of the corresponding avatar.

Advantageously, by encoding all of the video frames from each client device into a single tapestry image, the client may load the tapestry image into a video buffer once and then render portions from that buffer multiple times to the display in a single draw call on the client GPU, increasing rendering efficiency. For example, once loaded into the buffer, the client device may render a first portion of the tapestry image corresponding to a first avatar at a first position in the virtual environment, render a second portion of the tapestry image corresponding to a second avatar at a second position in the virtual environment, etc. In implementations in which the client device's own video frames are provided back to the client in the tapestry image (e.g. because it is being reused for proximate devices), the client device may simply not bother rendering the corresponding portion of the tapestry image.

Returning to FIG. 2A, server 220 may comprise a tapestry generator 242 and rescaling engine 244, which may be part of a GPU 240 and/or may be software executed by a GPU 240. Tapestry generator 242 may comprise an application, service, server, daemon, routine, or other executable logic or circuitry for generating tapestry images from successive video frames received from client devices, and for generating and encoding patch geometry at predetermined locations within the image as discussed above. Similarly, rescaling engine 244 may comprise an application, service, server, daemon, routine, or other executable logic or circuitry for dynamically rescaling video frames received from client devices according to positional differences between avatars within a virtual environment. Rescaling engine may reduce resolution, color depth, saturation, brightness, frame rates, or any other characteristic of video frames for inclusion in a tapestry image. As discussed above, rescaling engine may dynamically adjust rescaling parameters for each successive frame of a video stream based on the relative positions of avatars, and thus may process a first frame of a stream with a first configuration and second frame of the stream with a second configuration. Similarly, client devices 200 may comprise a graphics processing unit 240' for receiving tapestry images and/or video streams and rendering portions of the images and/or video streams on the surfaces of avatars within the virtual environment.

Figure 3A:
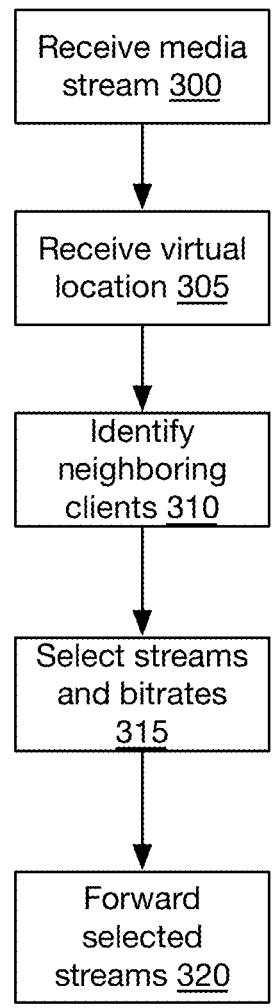
FIG. 3A is a flow chart of a method for stream selection in a teleconferencing virtual environment, according to some implementations.

FIG. 3A is a flow chart of a method for stream selection in a teleconferencing virtual environment, according to some implementations. At step 300, a server device may receive a media stream from a first client device (e.g. an audio and/or video stream). The media stream may be in a single bitrate or resolution in some implementations, and may be transcoded by the server to additional bitrates or resolutions. In other implementations, multiple media streams generated by the first client device in different bitrates or resolutions may be received from the client device. Similarly, the server device may receive media streams from one or more additional client devices.

At step 305, the server device may receive location information (e.g. position and orientation data) for an avatar corresponding to the first client device within a virtual environment. In many implementations, this location information may be received with packets of the media stream, and accordingly, steps 300-305 may be combined. Similarly, the server device may receive location information for one or more additional client devices.

At step 310, in some implementations, the server device may identify one or more additional client devices with corresponding avatars that are at neighboring positions to the avatar of the first client device according to the received location information. The additional client devices may be identified responsive to their avatars being proximate to the avatar of the first client device (e.g. with a distance between the avatars being less than a threshold), responsive to their avatars being within the same cell of a set of overlapping cells of the virtual environment, or by similar means.

At step 315, in some implementations, the server device may select media streams from the identified additional client devices to provide to the first client device (and may similarly select to provide media streams from the first client device to the identified additional client devices). In some implementations, streams of different bitrates or resolutions may be selected to be provided based on distance between the client device avatars, based on a size of the avatars (e.g. in a presentation mode), based on privacy settings of the avatars, or other considerations as discussed above.

At step 320, the selected media streams may be forwarded to the first client device (and the selected media streams of the first client device may be forwarded to the identified additional client devices). Forwarding the streams may comprise forwarding or retransmitting received packets of the media streams in some implementations, or may comprise transmitting a command to direct the first client device and each identified additional client device to establish a peer-to-peer connection and exchange media streams.

Figure 3B:
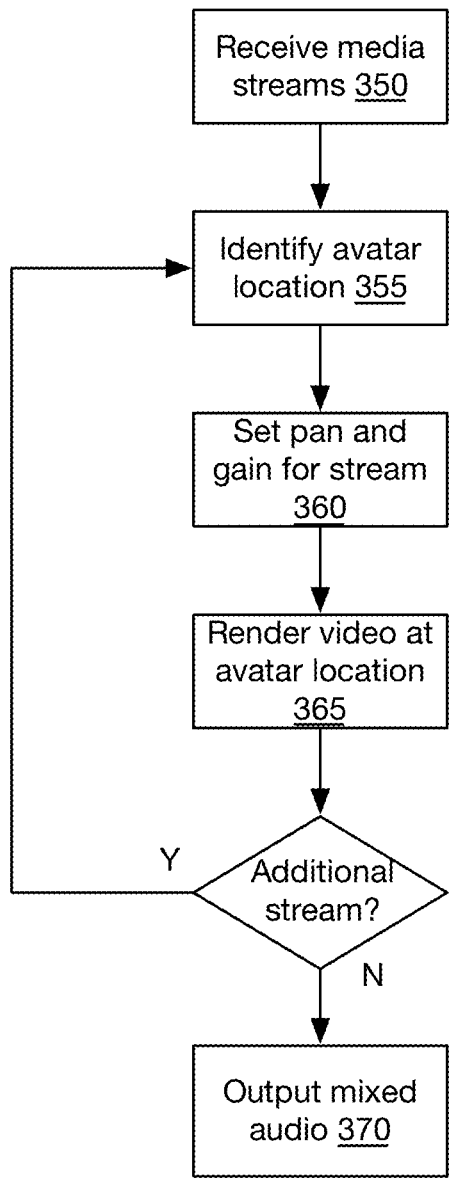
FIG. 3B is a flow chart of a method for rendering media streams in a teleconferencing virtual environment, according to some implementations.

FIG. 3B is a flow chart of a method for rendering media streams in a teleconferencing virtual environment, according to some implementations. At step 350, a client device may receive one or more media streams from a server or from peer-to-peer connections from other client devices.

At step 355, the client device may identify a location of an avatar within the virtual environment corresponding to a media stream and client device. The location information (e.g. position and orientation, scale, etc.) may be provided with packets of the media stream in many implementations. At step 360, the client device may determine audio mixing parameters for audio of the media stream based on a distance and direction to the identified location relative to a position and orientation of an avatar or virtual camera of the client device within the virtual environment, including panning, attenuation or gain, equalization, reverb, or other processing.

At step 365, the client device may render video of the media stream at the identified location of the avatar corresponding to the media stream (e.g. on an animated avatar, geometric avatar, or other entity as discussed above). Steps 355-365 may be repeated for each additional received media stream. At step 370, the audio of the one or more received media streams may be mixed and output to speakers or a headset of the client device according to the mixing parameters for each audio stream.

Accordingly, the methods and systems discussed herein provide a three-dimensional virtual environment with teleconferencing audio and video feeds placed within the environment via three-dimensional virtual avatars, including indications of directional orientation or facing, and with mixing of spatial audio providing directionality and distance cues. By utilizing a three dimensional environment for display of video streams, video streams corresponding to or displayed on avatars that are farther from the viewer appear smaller within the three dimensional view, and thus can be easily downscaled or reduced in resolution or bit rate without adversely affecting the user experience.

Figure 3C:
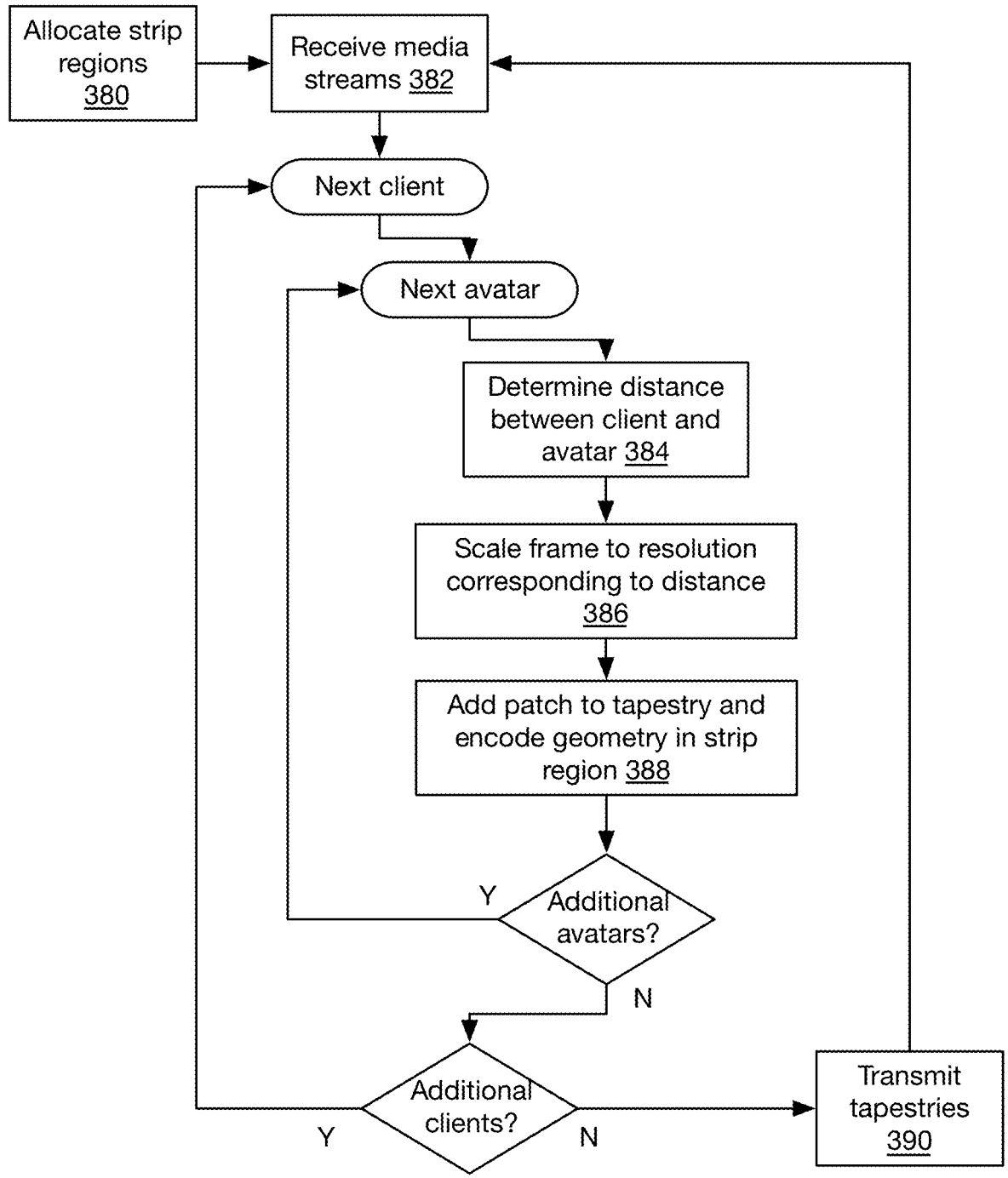
FIG. 3C is a flow chart of a server method for server-side aggregation of video for a teleconferencing application, according to some implementations.

FIG. 3C is a flow chart of a server method for server-side aggregation of video for a teleconferencing application, according to some implementations. At step 380, in some implementations, the server may identify the number of active avatars or clients within a session or virtual environment, and may allocate a geometric strip region of a tapestry according to the number of avatars or clients (e.g. with a sufficient length and height to encode a texel set for each corresponding patch).

At step 382, in some implementations, the server may receive frames of video streams from each client device. Starting with a first client device (e.g. the target or recipient device for a first tapestry image), the server may iteratively process a video frame from each other client device (e.g. each other active avatar within the session). To process the frame, at step 384 in some implementations, the server may determine a distance between an avatar of the target client device and the avatar of the other client device within the virtual environment. The server may compare the distance to one or more thresholds to select a corresponding resolution or rescaling configuration (e.g. distance<$threshold_1$=configuration 1; $threshold_1 \leq$ distance<$threshold_2$=configuration 2; $threshold_2 \leq$ distance<$threshold_3$=configuration 3; etc.). At step 386, the server may scale the frame according to the selected configuration or resolution, and at step 388, may add the patch to the tapestry and encode the geometry of the patch (e.g. x, y coordinates within the tapestry, and height and width of the patch in pixels) in the corresponding texels for the client device. As discussed above, the texels may be selected as a function of the client identifier identifying a unique combination of row and set number within a row of the strip. Steps 384-388 may be repeated for each additional active avatar to complete the tapestry. As discussed above, in many implementations, tapestry images may be created for each target client, and accordingly, steps 384-388 may be repeated iteratively for each other client, for each client. After generating the tapestry image, or after generating all the tapestry images, in various implementations, the tapestry image(s) may be transmitted to the client devices at step 390. The transmission may include other data, such as positional data for avatars, client identifiers, and the height and length of the geometric encoding strip.

Figure 3D:
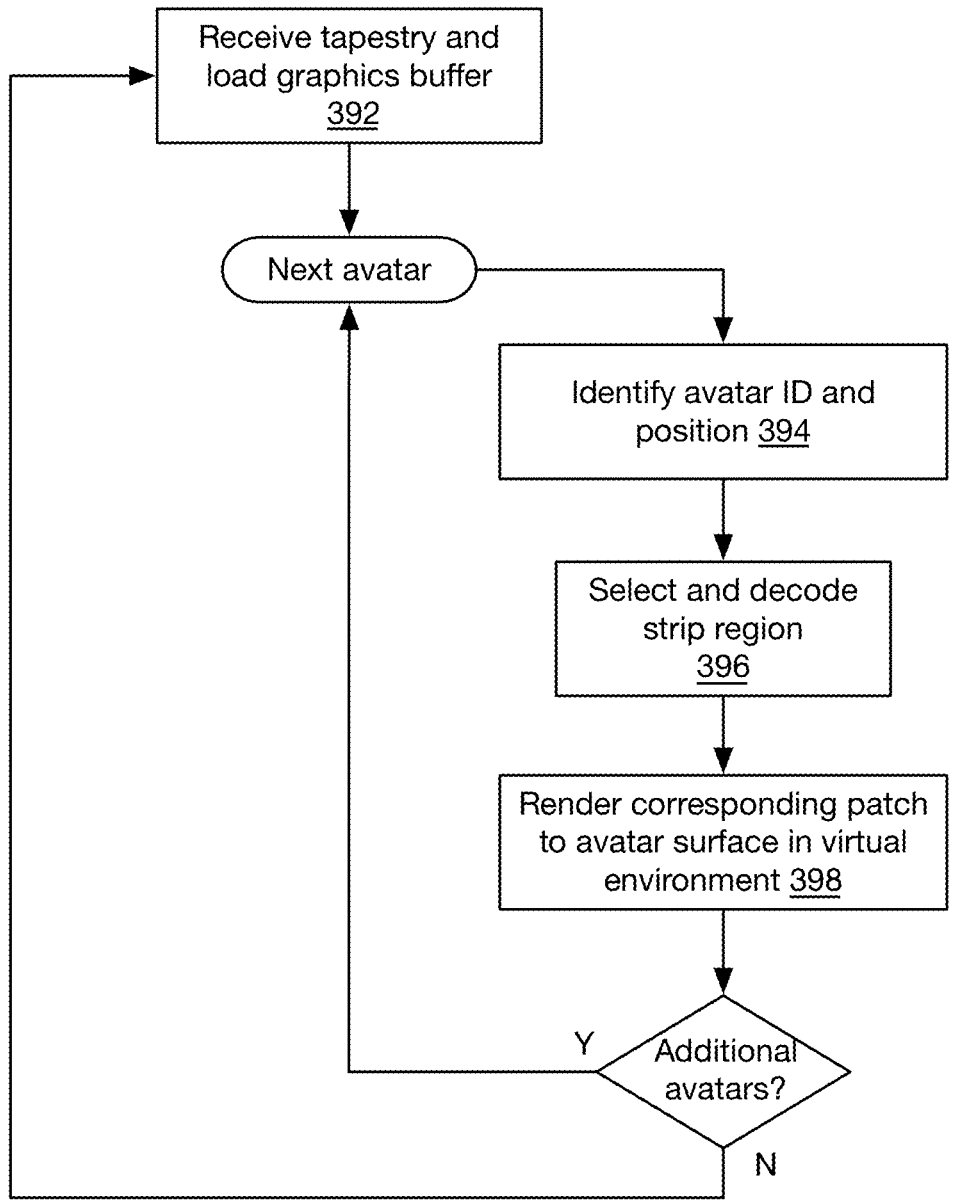
FIG. 3D is a flow chart of a client method for server-side aggregation of video for a teleconferencing application, according to some implementations.

FIG. 3D is a flow chart of a client method for server-side aggregation of video for a teleconferencing application, according to some implementations. In some implementations, a client may receive a tapestry image at step 392, and may load the image into a graphics buffer. The transmission of the image may be accompanied by metadata identifying the height and length of the geometric encoding strip, as well as client identifiers and positions of avatars within the virtual environment. For each client identifier and/or avatar, at step 394, the client device may identify the client identifier and position from the received data. At step 396, in some implementations, the client device may select a corresponding texel set in the graphics encoding strip of the tapestry image as a function of the client identifier as discussed above, and may decode the geometry of the corresponding patch. At step 398, the client device may render a portion of the tapestry image corresponding to the decoded geometry on a surface of the avatar at the identified position within the virtual environment. Steps 394-398 may be repeated for each additional active avatar or client identifier, and step 392 may be repeated for each new tapestry image of video frames.

Accordingly, the systems and methods discussed herein provide a three-dimensional virtual environment with teleconferencing audio and video feeds placed within the environment via three-dimensional virtual avatars, including indications of directional orientation or facing, and with mixing of spatial audio providing directionality and distance cues. By utilizing a three dimensional environment for display of video streams, video streams corresponding to or displayed on avatars that are farther from the viewer appear smaller within the three dimensional view, and thus can be easily downscaled or reduced in resolution or bit rate without adversely affecting the user experience.

Although primarily discussed in terms of a social networking or chat environment, the systems and methods discussed herein may be utilized for professional or semi-professional environments including presentations, real estate tours within a virtual environment (including a three-dimensional environment with textures captured from photographs or video, or video walk-throughs of a real location), museum tours or guided tours of environments (including photorealistic indoor or outdoor locations, 3D art galleries, etc.), retail environments with face-to-face interaction with representatives, collective watching of sporting events or movies, or other such interactions.

In a first aspect, the present disclosure is directed to a method for spatially-aware virtual teleconferencing. The method includes receiving, by a first computing device, one or more media streams generated by a corresponding one or more additional computing devices, and a location within a virtual environment associated with each of the one or more additional computing devices, the first computing device associated with a first location within the virtual environment. The method also includes adjusting, by the first computing device, audio characteristics of each of the one or more media streams according to a difference between the first location and the location within the virtual environment associated with the corresponding additional computing device. The method also includes rendering, by the first computing device via one or more output devices, a viewport into the virtual environment from the first location, each of the one or more media streams at the location within the virtual environment associated with the corresponding additional computing device, and the adjusted audio of the one or more media streams.

In some implementations, adjusting the audio characteristics of each of the one or more media streams further comprises determining a vector between the first location and the location within the virtual environment associated with the corresponding additional computing device, and applying stereo attenuation according to the determined vector. In a further implementation adjusting the audio characteristics of each of the one or more media streams further comprises determining that a vector between the first location and a second location associated with a first additional computing device passes through a virtual object, and responsive to the determination, increasing an amount of attenuation for the audio characteristics of the corresponding media stream.

In some implementations, adjusting the audio characteristics of each of the one or more media streams further comprises determining a direction and distance between the first location and the location associated with the corresponding additional computing device, and applying spatial processing to the corresponding audio stream based on the determined direction and distance. In a further implementation, applying spatial processing further comprises applying one or more of stereo attenuation, equalization, and reverb according to the determined direction and distance.

In some implementations, receiving the one or more media streams further comprises: receiving, by the first computing device from a server computing device, an identification of each of the one or more additional computing devices, and an aggregated video stream generated by the first computing device from media streams of each of the one or more additional computing devices; and retrieving, by the first computing device directly from each of the one or more additional computing devices, audio of the corresponding media stream, responsive to receipt of the identification of the additional computing device from the server computing device. In a further implementation, the aggregated video stream comprises a series of tapestry images of frames from video streams of the one or more additional computing devices, with each frame at a resolution corresponding to the difference between the first location and the location within the virtual environment associated with the corresponding additional computing device.

In another aspect, the present disclosure is directed to a method for server-side dynamic video aggregation for virtual teleconferencing. The method includes receiving, by a server device, a media stream from each of a plurality of client devices, each client device associated with a location within a virtual environment. The method also includes, for each client device of the plurality of client devices: for each other client device of the plurality of client devices: calculating a distance between a location of the client device within the virtual environment and a location of the other client device within the virtual environment; assigning a resolution to the media stream of the other client device corresponding to the calculated distance, and adding a video frame of the media stream of the other client device to a tapestry image at the assigned resolution. The method also includes transmitting the tapestry image to the client device, receipt of the tapestry image causing the client device to extract each video frame of the media stream of the other client devices and render the video frame at a location corresponding to the location of the other client device within the virtual environment.

In some implementations, adding the frame of the media stream of the other client device to the tapestry image further comprises encoding metadata of the frame in the tapestry image. In a further implementation, encoding metadata of the frame in the tapestry image further comprises adding pixels encoding geometry of the frame to a predetermined region of the tapestry image. In some implementations, the method includes, for each client device of the plurality of client devices, transmitting, to the client device, audio of the media streams from each other client device and an identification of the location within the virtual environment corresponding to each other client device. In a further implementation, receipt of the audio of the media streams from each other client device and the identification of the location within the virtual environment corresponding to each other client device causes each client device to render audio of the media streams with stereo attenuation based on a distance between the location associated with each corresponding other client device and a location associated with the client device.

In some implementations, the method includes, for each client device of the plurality of client devices, directing the client device to retrieve audio of the media streams of each other client device directly from each other client device. In a further implementation, receipt of the audio of the media streams from each other client device and the identification of the location within the virtual environment corresponding to each other client device causes each client device to render audio of the media streams with stereo attenuation based on a distance between the location associated with each corresponding other client device and a location associated with the client device.

In another aspect, the present disclosure is directed to a method for server-side dynamic video aggregation for virtual teleconferencing. The method includes receiving, by a client device from a server device, a tapestry image comprising a video frame from each of one or more additional client devices with a resolution corresponding to a distance between a location associated with the client device within a virtual environment and a location associated with the additional client device. The method also includes loading, by the client device, the tapestry image into a graphics buffer. The method also includes, iteratively for each of the video frames in the tapestry image: identifying the location associated with the corresponding additional client device within the virtual environment, and rendering, from the graphics buffer, a portion of the tapestry image comprising the video frame at the identified location within the virtual environment.

In some implementations, the tapestry image comprises one or more sets of pixels encoding a geometry of the corresponding video frame from each of the one or more additional client devices. In a further implementation, the method includes, for each of the video frames in the tapestry image, decoding the geometry of the video frame from the corresponding set of pixels; and wherein rendering the portion of the tapestry image comprising the video frame at the identified location within the virtual environment comprises rendering the tapestry image with boundaries according to the decoded geometry. In another further implementation, the method includes, for each of the video frames in the tapestry image: receiving an identifier of the corresponding additional client device; and determining a location of the set of pixels encoding the geometry of the video frame based on the identifier of the corresponding additional client device.

In some implementations, the method includes receiving, by the client device from each of the one or more additional client devices, an audio stream; adjusting an audio characteristic of each of the received audio streams based on the location associated with the corresponding additional client device within the virtual environment and the location associated with the client device; and outputting, by the client device, the adjusted audio streams. In a further implementation, adjusting the audio characteristic of each of the received audio streams further comprises determining a direction and distance between the location associated with the client device and the location associated with the corresponding additional client device, and applying spatial processing to the corresponding audio stream based on the determined direction and distance. In a still further implementation, applying spatial processing further comprises applying one or more of stereo attenuation, equalization, and reverb according to the determined direction and distance.

B. Computing Environment

Having discussed specific embodiments of the present solution, it may be helpful to describe aspects of the operating environment as well as associated system components (e.g., hardware elements) in connection with the methods and systems described herein.

Figure 4A:
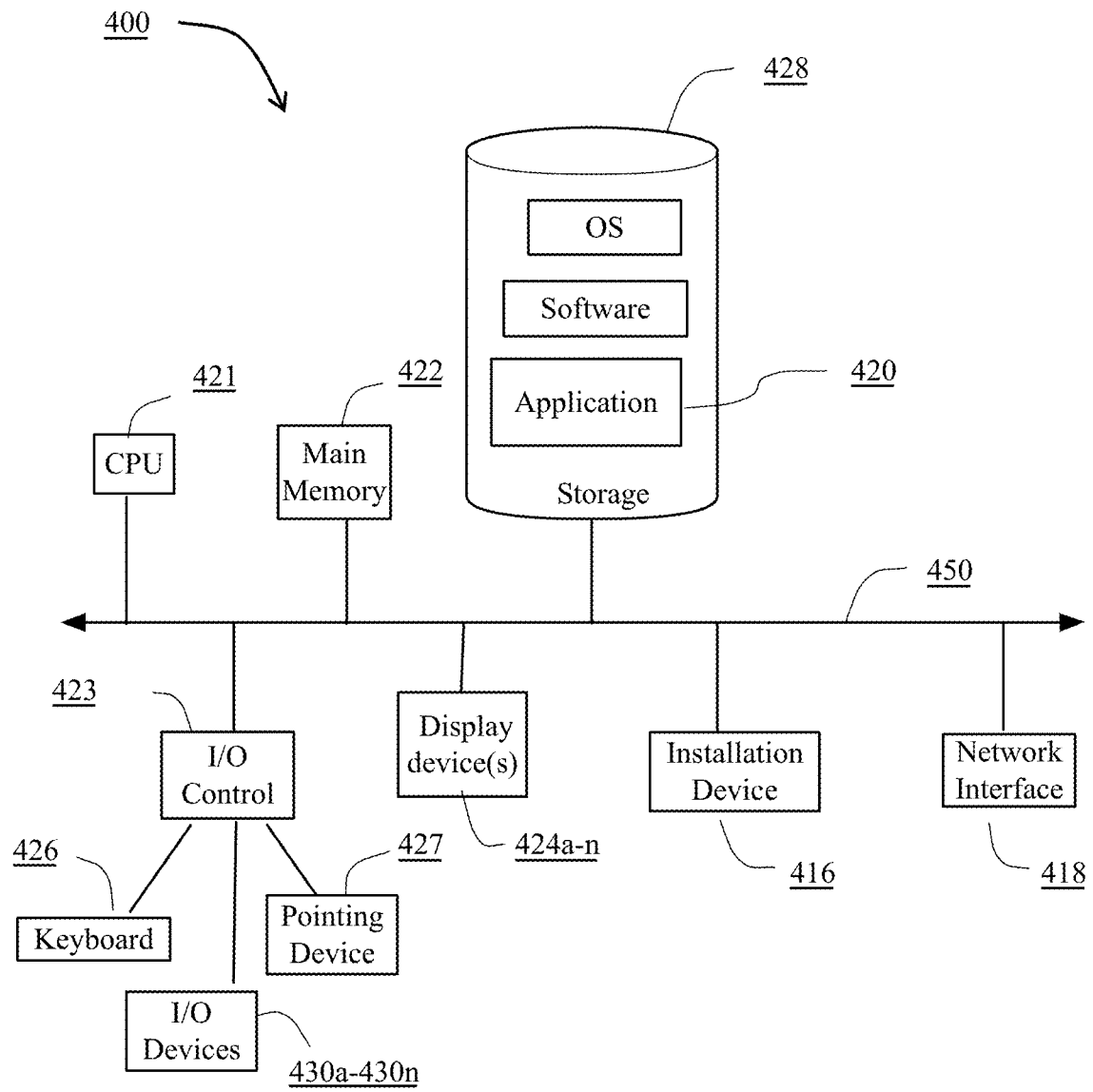
FIGS. 4A and 4B are block diagrams depicting embodiments of computing devices useful in connection with the methods and systems described herein.
Figure 4B:
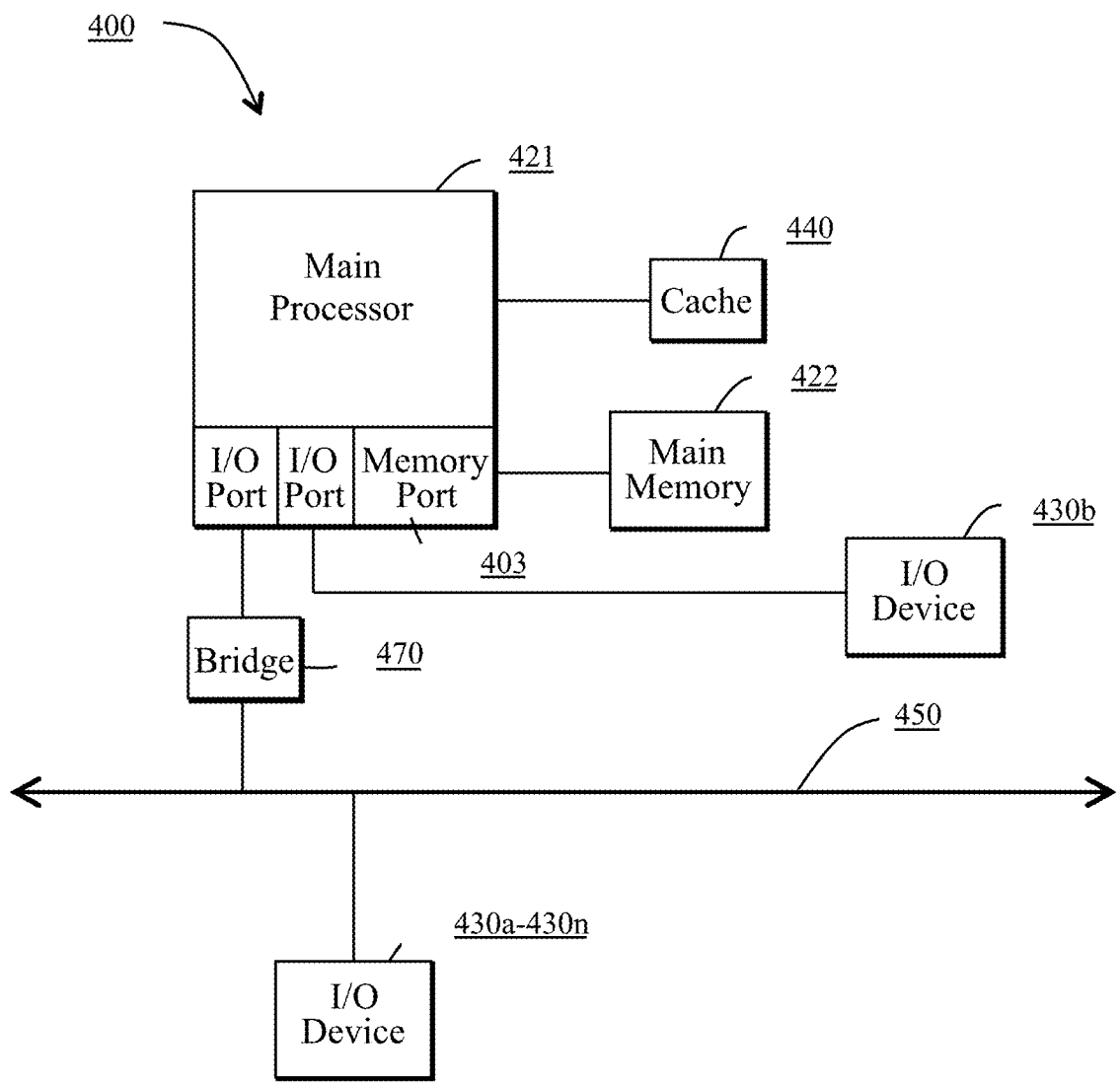

The systems discussed herein may be deployed as and/or executed on any type and form of computing device, such as a computer, network device or appliance capable of communicating on any type and form of network and performing the operations described herein. FIGS. 4A and 4B depict block diagrams of a computing device 400 useful for practicing implementations of the systems and methods discussed herein. As shown in FIGS. 4A and 4B, each computing device 400 includes a central processing unit 421, and a main memory unit 422. As shown in FIG. 4A, a computing device 400 may include a storage device 428, an installation device 416, a network interface 418, an I/O controller 423, display devices 424*a*-424*n*, a keyboard 426 and a pointing device 427, such as a mouse. The storage device 428 may include, without limitation, an operating system and/or software. As shown in FIG. 4B, each computing device 400 may also include additional optional elements, such as a memory port 403, a bridge 470, one or more input/output devices 430*a*-430*n* (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 400 may be based on any of these processors, or any other processor capable of operating as described herein.

Main memory unit 422 may be one or more memory chips capable of storing data and allowing any storage location to be directly accessed by the microprocessor 421, such as any type or variant of Static random access memory (SRAM), Dynamic random access memory (DRAM), Ferroelectric RAM (FRAM), NAND Flash, NOR Flash and Solid State Drives (SSD). The main memory 422 may be based on any of the above described memory chips, or any other available memory chips capable of operating as described herein. In the embodiment shown in FIG. 4A, the processor 421 communicates with main memory 422 via a system bus 450 (described in more detail below). FIG. 4B depicts an embodiment of a computing device 400 in which the processor communicates directly with main memory 422 via a memory port 403. For example, in FIG. 4B the main memory 422 may be DRDRAM.

FIG. 4B depicts an embodiment in which the main processor 421 communicates directly with cache memory 440 via a secondary bus, sometimes referred to as a backside bus. In other embodiments, the main processor 421 communicates with cache memory 440 using the system bus 450. Cache memory 440 typically has a faster response time than main memory 422 and is provided by, for example, SRAM, BSRAM, or EDRAM. In the embodiment shown in FIG. 4B, the processor 421 communicates with various I/O devices 430 via a local system bus 450. Various buses may be used to connect the central processing unit 421 to any of the I/O devices 430, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4B depicts an embodiment of a computer 400 in which the main processor 421 may communicate directly with I/O device 430*b*, for example via HYPERTRANSPORT, RAPIDIO, or INFINIBAND communications technology. FIG. 4B also depicts an embodiment in which local busses and direct communication are mixed: the processor 421 communicates with I/O device 430*a* using a local interconnect bus while communicating with I/O device 430*b* directly.

A wide variety of I/O devices 430*a*-430*n* may be present in the computing device 400. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 423 as shown in FIG. 4A. The I/O controller may control one or more I/O devices such as a keyboard 426 and a pointing device 427, e.g., a mouse or optical pen. Furthermore, an I/O device may also provide storage and/or an installation medium 416 for the computing device 400. In still other embodiments, the computing device 400 may provide USB connections (not shown) to receive handheld USB storage devices such as the USB Flash Drive line of devices manufactured by Twintech Industry, Inc. of Los Alamitos, Calif.

Referring again to FIG. 4A, the computing device 400 may support any suitable installation device 416, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 400 may further include a storage device, such as one or more hard disk drives or redundant arrays of independent disks, for storing an operating system and other related software, and for storing application software programs such as any program or software 420 for implementing (e.g., configured and/or designed for) the systems and methods described herein. Optionally, any of the installation devices 416 could also be used as the storage device. Additionally, the operating system and the software can be run from a bootable medium.

Furthermore, the computing device 400 may include a network interface 418 to interface to the network 404 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 400 communicates with other computing devices 400' via any type and/or form of gateway or tunneling protocol such as Secure Socket Layer (SSL) or Transport Layer Security (TLS). The network interface 418 may include a built-in network adapter, network interface card, PCMCIA network card, card bus network adapter, wireless network adapter, USB network adapter, modem or any other device suitable for interfacing the computing device 400 to any type of network capable of communication and performing the operations described herein.

In some embodiments, the computing device 400 may include or be connected to one or more display devices 424a-424n. As such, any of the I/O devices 430a-430n and/or the I/O controller 423 may include any type and/or form of suitable hardware, software, or combination of hardware and software to support, enable or provide for the connection and use of the display device(s) 424a-424n by the computing device 400. For example, the computing device 400 may include any type and/or form of video adapter, video card, driver, and/or library to interface, communicate, connect or otherwise use the display device(s) 424a-424n. In one embodiment, a video adapter may include multiple connectors to interface to the display device(s) 424a-424n. In other embodiments, the computing device 400 may include multiple video adapters, with each video adapter connected to the display device(s) 424a-424n. In some embodiments, any portion of the operating system of the computing device 400 may be configured for using multiple displays 424a-424n. One ordinarily skilled in the art will recognize and appreciate the various ways and embodiments that a computing device 400 may be configured to have one or more display devices 424a-424n.

In further embodiments, an I/O device 430 may be a bridge between the system bus 450 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 400 of the sort depicted in FIGS. 4A and 4B may operate under the control of an operating system, which control scheduling of tasks and access to system resources. The computing device 400 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Washington; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 400 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 400 has sufficient processor power and memory capacity to perform the operations described herein.

In some embodiments, the computing device 400 may have different processors, operating systems, and input devices consistent with the device. For example, in one embodiment, the computing device 400 is a smart phone, mobile device, tablet or personal digital assistant. In still other embodiments, the computing device 400 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/ or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed:

1. A method for spatially-aware virtual teleconferencing, comprising:
    receiving, by a first computing device from a server computing device, an identification of each of a plurality of additional computing devices and an aggregated video stream generated by the server computing device from media streams of each of the plurality of additional computing devices, and a location within a virtual environment associated with each of the plurality of additional computing devices, the first computing device associated with a first location within the virtual environment;
    retrieving, by the first computing device directly from each of the plurality of additional computing devices, audio of the corresponding media stream, responsive to receipt of the identification of the additional computing device from the server computing device;
    adjusting, by the first computing device, audio characteristics of each of the plurality of media streams according to a difference between the first location and the location within the virtual environment associated with the corresponding additional computing device; and
    rendering, by the first computing device via one or more output devices, a viewport into the virtual environment from the first location, each of the plurality of media streams at the location within the virtual environment associated with the corresponding additional computing device, and the adjusted audio of the plurality of media streams.

2. The method of claim 1, wherein adjusting the audio characteristics of each of the plurality of media streams further comprises determining a vector between the first location and the location within the virtual environment associated with the corresponding additional computing device, and applying stereo attenuation according to the determined vector.

3. The method of claim 2, wherein adjusting the audio characteristics of each of the plurality of media streams further comprises determining that a vector between the first location and a second location associated with a first additional computing device passes through a virtual object, and responsive to the determination, increasing an amount of attenuation for the audio characteristics of the corresponding media stream.

4. The method of claim 1, wherein adjusting the audio characteristics of each of the plurality of media streams further comprises determining a direction and distance between the first location and the location associated with the corresponding additional computing device, and applying spatial processing to the corresponding audio stream based on the determined direction and distance.

5. The method of claim 4, wherein applying spatial processing further comprises applying one or more of stereo attenuation, equalization, and reverb according to the determined direction and distance.

6. The method of claim 1, wherein the aggregated video stream comprises a series of tapestry images of frames from video streams of the plurality of additional computing devices, with each frame at a resolution corresponding to the difference between the first location and the location within the virtual environment associated with the corresponding additional computing device.

7. A method for server-side dynamic video aggregation for virtual teleconferencing, comprising:
    receiving, by a server device, a media stream from each of a plurality of client devices, each client device associated with a location within a virtual environment, the plurality of client devices comprising at least three client devices;
    for each client device of the plurality of client devices:
        calculating a distance between a location of the client device within the virtual environment and a location of each other client device within the virtual environment;
        assigning a resolution to the media stream of each other client device based on the corresponding calculated distance;
        adding a video frame of the media stream of each other client device to a tapestry image at the corresponding assigned resolution;
        transmitting the tapestry image to the client device, receipt of the tapestry image causing the client device to extract each video frame of the media stream of the other client devices and render the video frame at a location corresponding to the location of the other client device within the virtual environment; and
        directing the client device to retrieve audio of the media streams of each other client device directly from each other client device.

8. The method of claim 7, wherein adding the frame of the media stream of each other client device to the tapestry image further comprises encoding metadata of the frame in the tapestry image.

9. The method of claim 8, wherein encoding metadata of the frame in the tapestry image further comprises adding pixels encoding geometry of the frame to a predetermined region of the tapestry image.

10. The method of claim 7, further comprising, for each client device of the plurality of client devices, transmitting, to the client device, audio of the media streams from each other client device and an identification of the location within the virtual environment corresponding to each other client device.

11. The method of claim 10, wherein receipt of the audio of the media streams from each other client device and the identification of the location within the virtual environment corresponding to each other client device causes each client device to render audio of the media streams with stereo attenuation based on a distance between the location associated with each corresponding other client device and a location associated with the client device.

12. The method of claim 7, wherein receipt of the audio of the media streams from each other client device and the identification of the location within the virtual environment corresponding to each other client device causes each client device to render audio of the media streams with stereo attenuation based on a distance between the location associated with each corresponding other client device and a location associated with the client device.

13. A method for server-side dynamic video aggregation for virtual teleconferencing, comprising:

receiving, by a client device from a server device, a tapestry image comprising a video frame from each of a plurality of additional client devices with a resolution corresponding to a distance between a location associated with the client device within a virtual environment and a location associated with the additional client device;

loading, by the client device, the tapestry image into a graphics buffer;

iteratively for each of the video frames in the tapestry image:

identifying the location associated with the corresponding additional client device within the virtual environment, and rendering, from the graphics buffer, a portion of the tapestry image comprising the video frame at the identified location within the virtual environments;

receiving, by the client device from each of the plurality of additional client devices, an audio stream;

adjusting an audio characteristic of each of the received audio streams based on the location associated with the corresponding additional client device within the virtual environment and the location associated with the client device; and outputting, by the client device, the adjusted audio streams.

14. The method of claim 13, wherein the tapestry image comprises one or more sets of pixels encoding a geometry of the corresponding video frame from each of the plurality of additional client devices.

15. The method of claim 14, further comprising, for each of the video frames in the tapestry image, decoding the geometry of the video frame from the corresponding set of pixels; and wherein rendering the portion of the tapestry image comprising the video frame at the identified location within the virtual environment comprises rendering the tapestry image with boundaries according to the decoded geometry.

16. The method of claim 14, further comprising, for each of the video frames in the tapestry image:

receiving an identifier of the corresponding additional client device; and determining a location of the set of pixels encoding the geometry of the video frame based on the identifier of the corresponding additional client device.

17. The method of claim 13, wherein adjusting the audio characteristic of each of the received audio streams further comprises determining a direction and distance between the location associated with the client device and the location associated with the corresponding additional client device, and applying spatial processing to the corresponding audio stream based on the determined direction and distance.

18. The method of claim 17, wherein applying spatial processing further comprises applying one or more of stereo attenuation, equalization, and reverb according to the determined direction and distance.

* * * * *